(12) United States Patent
Kajiwara et al.

(10) Patent No.: US 7,387,255 B2
(45) Date of Patent: Jun. 17, 2008

(54) PORTABLE TERMINAL APPARATUS

(75) Inventors: Yoshifumi Kajiwara, Sapporo (JP); Yoshiaki Kato, Sapporo (JP); Nariyasu Hayakawa, Sapporo (JP); Toshikazu Ishioka, Sapporo (JP); Hiroaki Sakashita, Sapporo (JP); Manabu Hongo, Sapporo (JP); Hidehiko Hizuka, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/019,207

(22) Filed: Dec. 23, 2004

(65) Prior Publication Data
US 2006/0038019 A1 Feb. 23, 2006

(30) Foreign Application Priority Data
Aug. 18, 2004 (JP) .............................. 2004-238538

(51) Int. Cl.
*G06K 7/10* (2006.01)
(52) U.S. Cl. .................................. 235/472.02
(58) Field of Classification Search ............ 235/472.02
See application file for complete search history.

(56) References Cited

U.S. PATENT DOCUMENTS 6,922,212 B2 * 7/2005 Nakakubo et al. .......... 348/373

| | | | |
|---|---|---|---|
| 2003/0071342 A1 * | 4/2003 | Honda et al. | 257/687 |
| 2004/0021792 A1 | 2/2004 | Yasui | |
| 2004/0051779 A1 * | 3/2004 | Tatehana et al. | 348/14.02 |
| 2004/0075620 A1 * | 4/2004 | Tanaka et al. | 345/1.1 |
| 2004/0233650 A1 * | 11/2004 | Miyashita et al. | 361/760 |

FOREIGN PATENT DOCUMENTS

| | | |
|---|---|---|
| CN | 1479506 A | 3/2004 |
| JP | 2004-64575 | 2/2004 |

* cited by examiner

*Primary Examiner*—Karl D. Frech
*Assistant Examiner*—Tae W Kim
(74) *Attorney, Agent, or Firm*—Staas & Halsey LLP

(57) ABSTRACT

A portable terminal apparatus with a telephone function and a camera module. The apparatus includes a chassis, a camera module including a lens and an image pickup device, a circuit board placed and fixed on the chassis and a camera holder supporting the camera module and fixed on the circuit board to be on the chassis together with the circuit board. The camera holder has an opening for the camera module to look in and a wall section surrounding the opening and surrounding a side face of the camera module to support the camera module.

16 Claims, 27 Drawing Sheets

PORTABLE TERMINAL APPARATUS

BACKGROUND OF THE INVENTION

1. Field of the Invention

The present invention relates to a portable terminal apparatus with a telephone function, such as a portable telephone.

2. Description of the Related Art

In recent years, portable terminal apparatus such as portable telephones are remarkably developing, and it is demanded that they become further multifunctional, miniaturized and lightweight.

As for multifunction, it is almost becoming a matter of course that the portable telephone has a high-pixel digital camera mounted thereon in recent years. For instance, Japanese Patent Laid-Open No. 2004-64575 discloses a technique for mounting two cameras facing mutually opposed directions on the portable terminal apparatus.

Here, the portable terminal apparatus such as a portable telephone is demanded to become further miniaturized and lightweight. For this reason, miniaturization and high-density mounting of its parts are underway. In that case, there is a problem of how to mount a camera on such a portable telephone of which miniaturization and high-density mounting are advanced.

The camera mounted on the portable telephone is in a form called a camera module (or a camera unit) having a lens and an image pickup device built therein. The camera module is a precision part which requires relative positions of the lens and image pickup device to be kept with high precision. Therefore, to mount the camera module inside the portable telephone, the camera has a structure in which the camera module is supported by a dedicated frame to securely fix it formed on a plate-like member called a chassis (or a frame) typically metallic, die-cast and strong enough to be hardly deformable. The foregoing patent document also indicates the structure in which the camera module is fixed on the chassis.

However, multifunctionality has advanced, and the chassis has various parts built into it, such as having two liquid crystal display screens mounted and a flexible board fixed thereon, for instance. For this reason, if the frame for mounting the camera module is provided on the chassis, it becomes an obstacle to wiring of the flexible board for instance. Thus, it is becoming difficult to fix the camera module on the chassis. It is impossible to render the chassis larger-size in spite of the demands for miniaturization, and so there is a trend that the chassis itself is miniaturized.

SUMMARY OF THE INVENTION

The present invention has been made in view of the above circumstances and is intended to provide the portable terminal apparatus such as the portable telephone on which the camera module is resourcefully mounted.

The portable terminal apparatus according to the present invention is the one with a telephone function, including:
a chassis;
a camera module including a lens and an image pickup device;
a circuit board placed and fixed on the chassis; and
a camera holder supporting the camera module and fixed on the chassis together with the circuit board.

The portable terminal apparatus according to the present invention includes a camera holder supporting the camera module and fixed on the chassis together with the circuit board. Therefore, the camera module does not need the frame to be provided on the chassis when directly fixing the camera module on the chassis, and so it can be precisely fixed even if the flexible board is extended on the chassis.

Here, the portable terminal apparatus according to the present invention may be the one wherein: the circuit board has a window section for placement of the camera module formed thereon; and the camera holder supports and places the camera module at a place allowing the camera module to look in through an opening of the circuit board and is fixed on the chassis together with the circuit board.

Here, the window section may be the opening or a notch provided on the circuit board.

It is possible to easily secure a field of vision at the front of the lens by providing the window section to the circuit board.

As for the portable terminal apparatus according to the present invention, it is desirable that the chassis support a back face of the camera module supported by the camera holder with the circuit board placed on the chassis.

It is possible, by having the structure in which the chassis supports the back face of the camera module, to have the camera module supported by the camera holder and have its back face supported by the chassis so as to be fixed more securely.

As for the portable terminal apparatus according to the present invention, it is desirable that the camera holder has an opening for the camera module to look in and a wall section surrounding a side face of the camera module to support the camera module and mounted surrounding the opening.

It is possible, by providing the wall section, to securely fix the camera module on the camera holder and improve robustness for protecting the camera from an impact.

As for the portable terminal apparatus according to the present invention, the chassis may support a flexible board extended on a back face of the camera module in a state in which the circuit board is placed on the chassis, or the chassis may have a display screen which displays an image and a contact which is turned on and off by an operation button mounted on a surface of a backside to a side having the circuit board placed thereon.

As the portable terminal apparatus according to the present invention fixes the camera module on the chassis via the camera holder instead of directly fixing it thereon, it is possible to place the flexible board, contact and the like on the chassis.

As described above, according to the present invention, it is possible to eliminate necessity to directly fix the camera module on the chassis so as to combine the multifunctionality and miniaturization in a high level.

DETAILED DESCRIPTION OF THE INVENTION

Hereafter, an embodiment of the present invention will be described.

FIGS. 1 to 4 are perspective views showing an appearance of a portable telephone which is an embodiment of the present invention.

Figure 1:
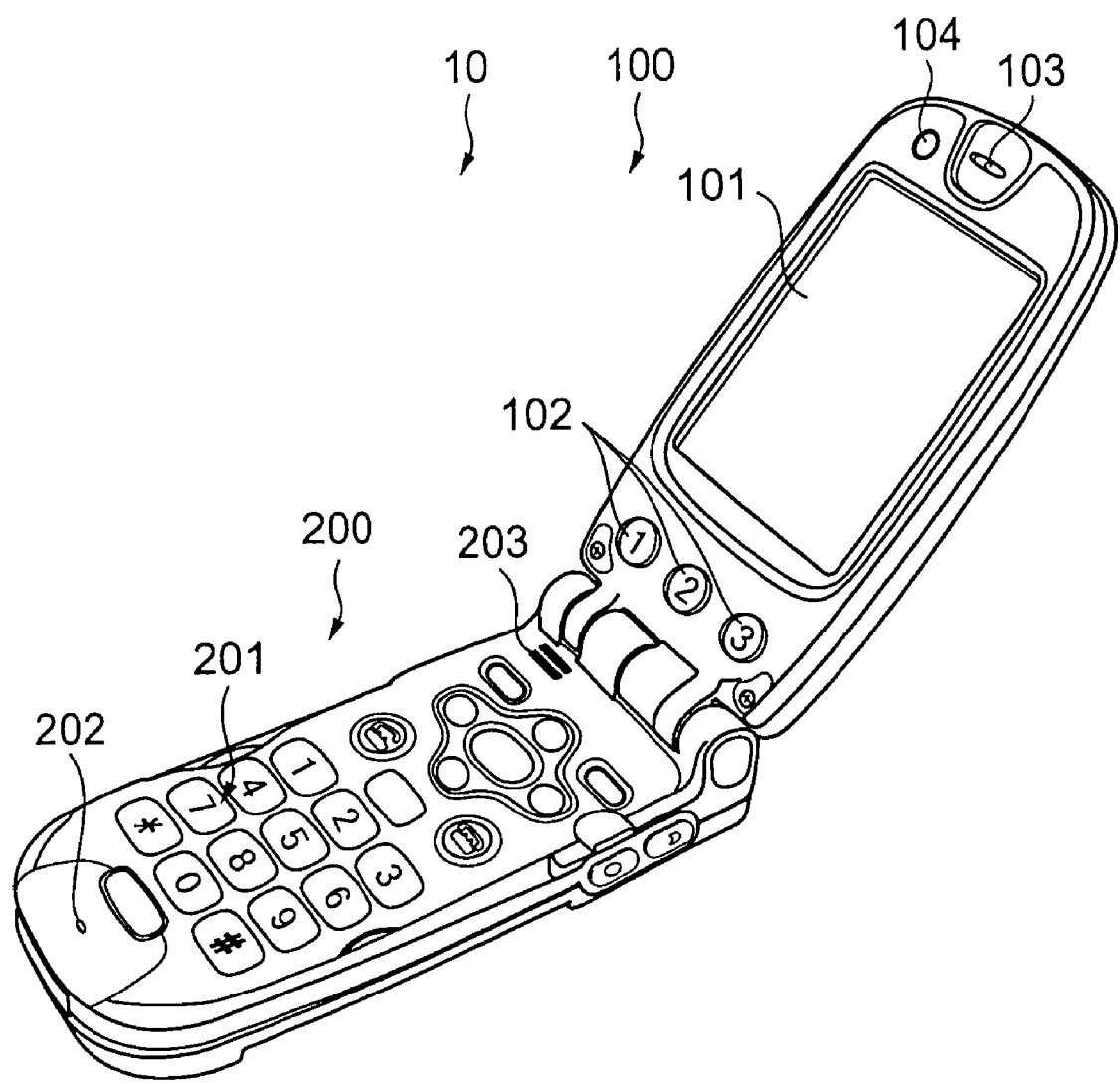
FIG. 1 is a perspective view showing an appearance of a portable telephone as an embodiment of a portable terminal apparatus according to the present invention.

The portable telephone shown here is a folding type. FIG. 1 is a perspective view showing an inside in an open state, FIG. 2 is a perspective view showing an outside in the open state, FIG. 3 is a perspective view showing an upside housing in a closed state, and FIG. 4 is a perspective view showing a downside housing in the closed state.

A portable telephone 10 includes an upside housing 100 and a downside housing 200 mutually supported on an axis to be pivotable.

As shown in FIG. 1, on an inner face of the upside housing 100, there is a large display window 101 for viewing a liquid crystal display screen placed therein extended in the middle. The display window 101 has three push buttons 102 arranged on its downside. On the upside of the display window 101, there are also an ear piece 103 for putting one's ear thereto to catch voice and a shooting window 104 for a digital camera facing the inside (the digital camera is called an "in-camera" here because it faces the inside) to look in provided beside it.

Figure 2:
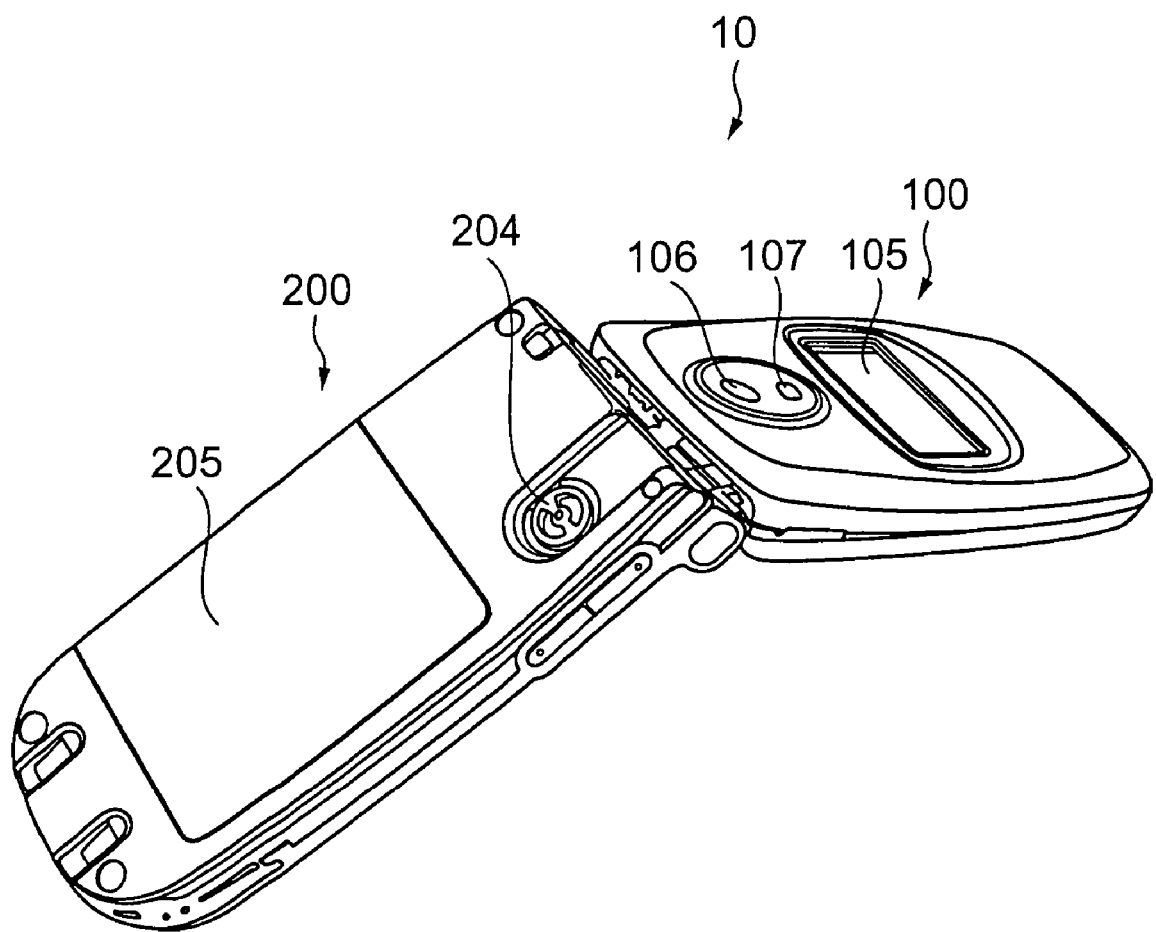
FIG. 2 is a perspective view showing the appearance of the portable telephone as an embodiment of the portable terminal apparatus according to the present invention.
Figure 3:
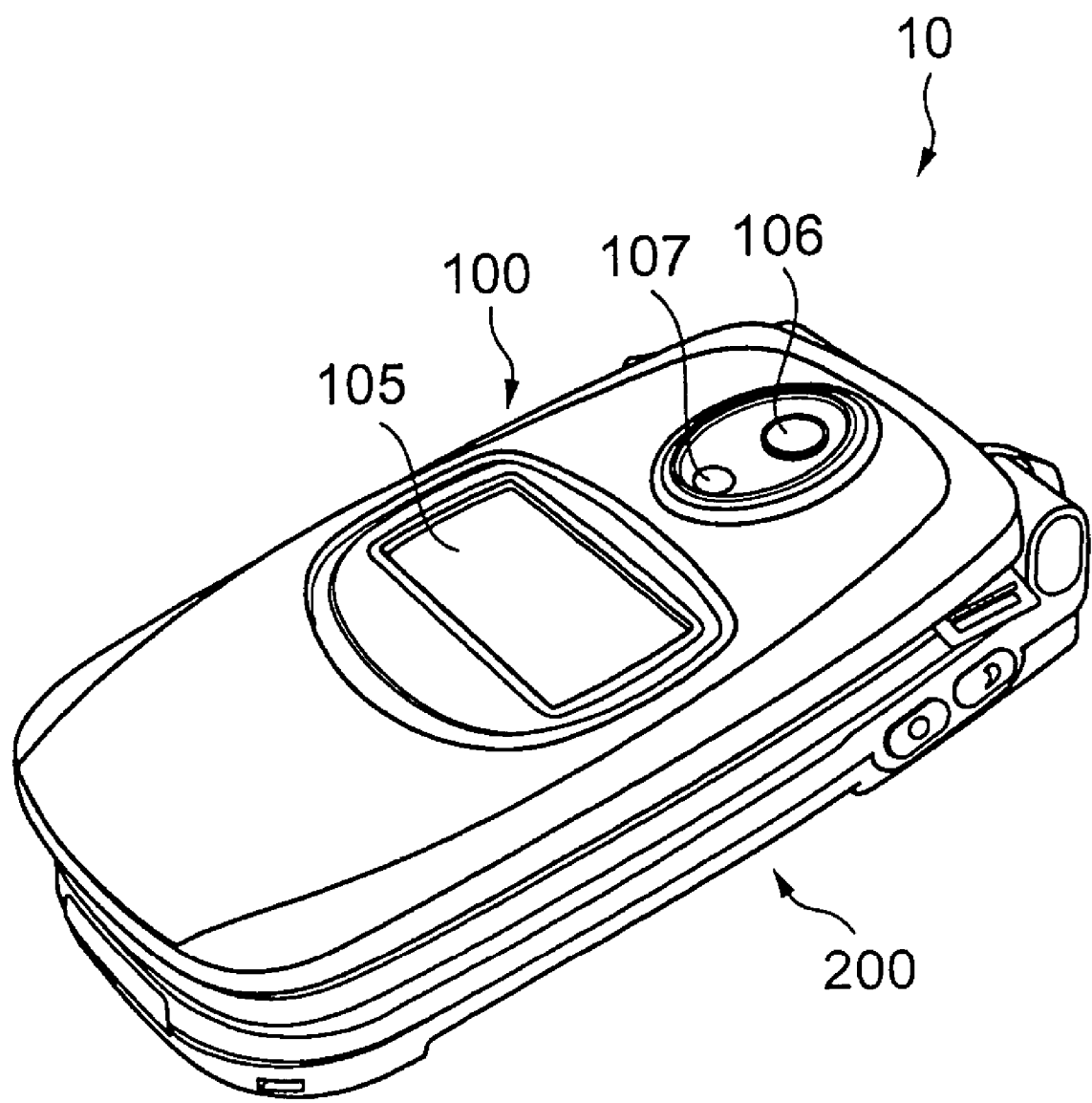
FIG. 3 is a perspective view showing the appearance of the portable telephone as an embodiment of the portable terminal apparatus according to the present invention.
Figure 4:
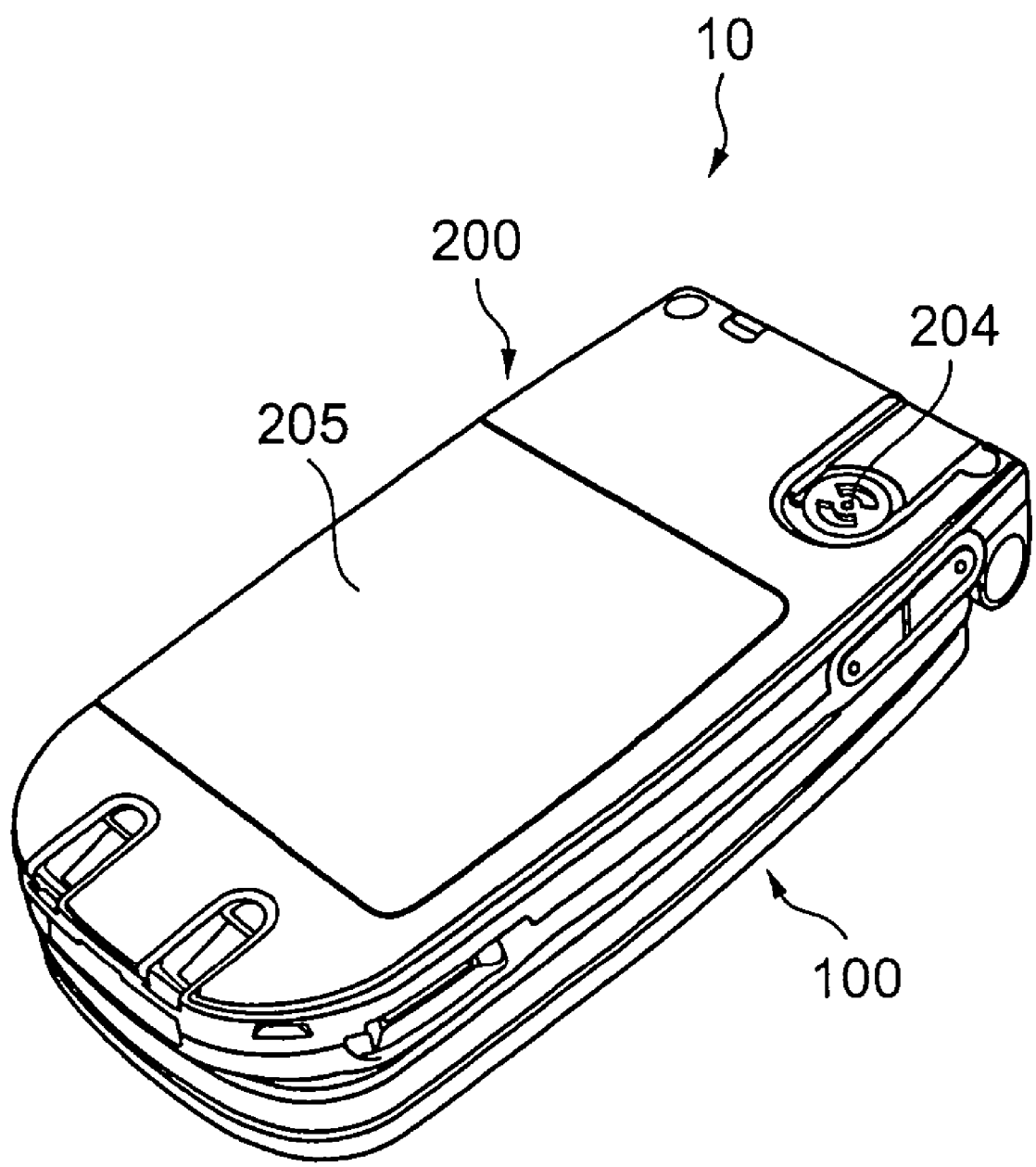
FIG. 4 is a perspective view showing the appearance of the portable telephone as an embodiment of the portable terminal apparatus according to the present invention.

As shown in FIGS. 2 and 3, the upside housing 100 has a display window 105 for viewing another liquid crystal display screen placed therein provided in the middle of an outer face thereof. On a hinge side linked to the downside housing 200 further from the display window 105, there are provided a shooting window 106 for another digital camera (the digital camera is called an "out-camera" here because it faces the outside) to look in and a lighting section 107 for lighting up by having an LED inside it emit light to give notice of an incoming call and so on.

On an inner side face of the downside housing 200, there are a number of arranged push buttons 201 and a mouthpiece 202 having a microphone for receiving a user's voice and converting it to an electrical signal provided therein on the downside of the push buttons 201 as shown in FIG. 1. Furthermore, a sound outlet 203 for emitting the voice from a speaker provided inside is provided in the proximity of the hinge section of the downside housing 200 linked to the upside housing 100. As will be described later, the speaker provided at a depth of the sound outlet 203 faces the outside of the downside housing 200. Therefore, the sound outlet 203 is placed on a backside of the speaker.

As shown in FIGS. 2 and 4, the downside housing 200 has another sound outlet 204 for emitting the voice from the speaker front and a battery accommodating section 205 having a battery accommodated therein provided on the outer face thereof.

Figure 5:
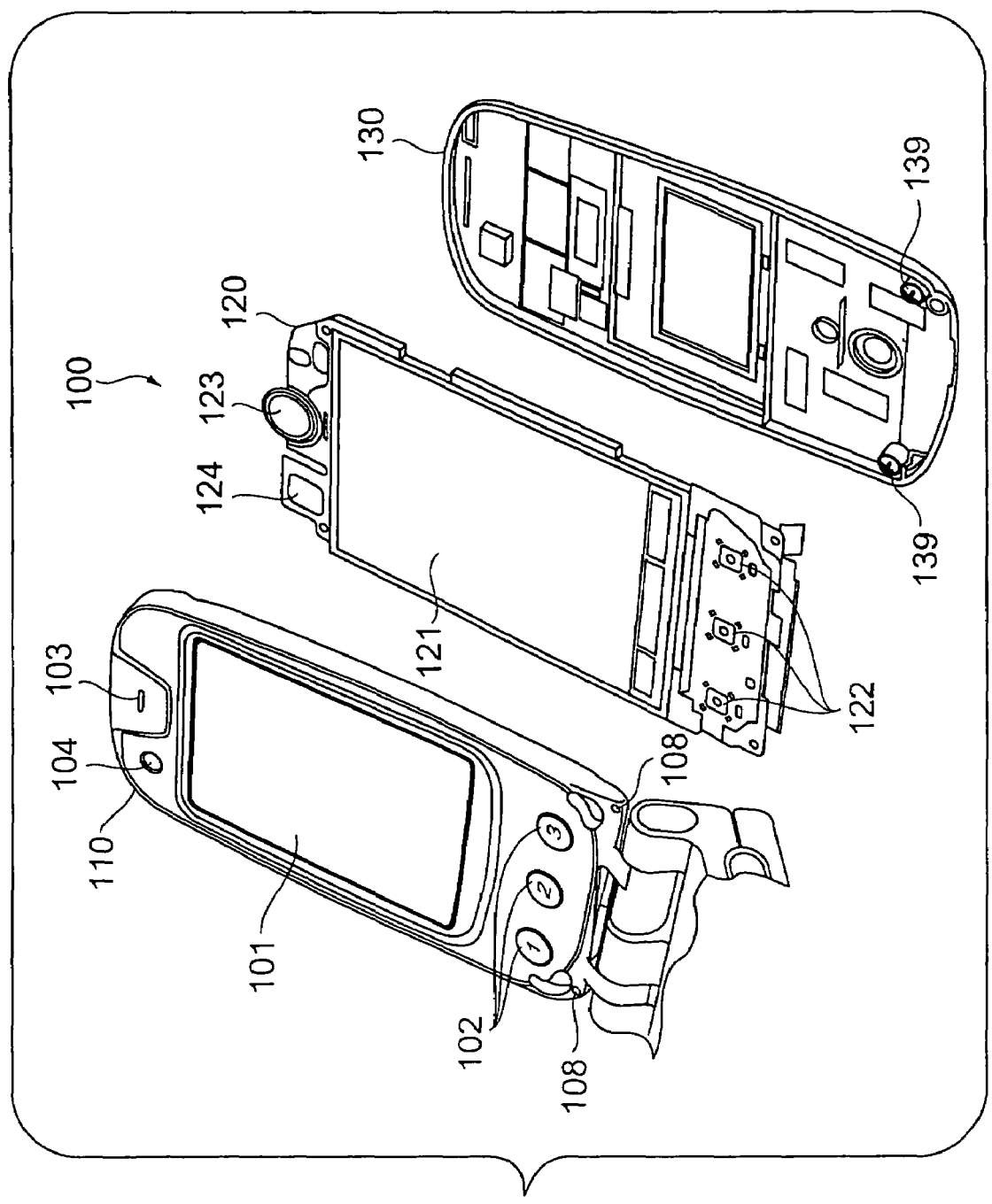
FIG. 5 is an exploded perspective view of an upside housing of the portable telephone shown in FIGS. 1 to 4.
Figure 6:
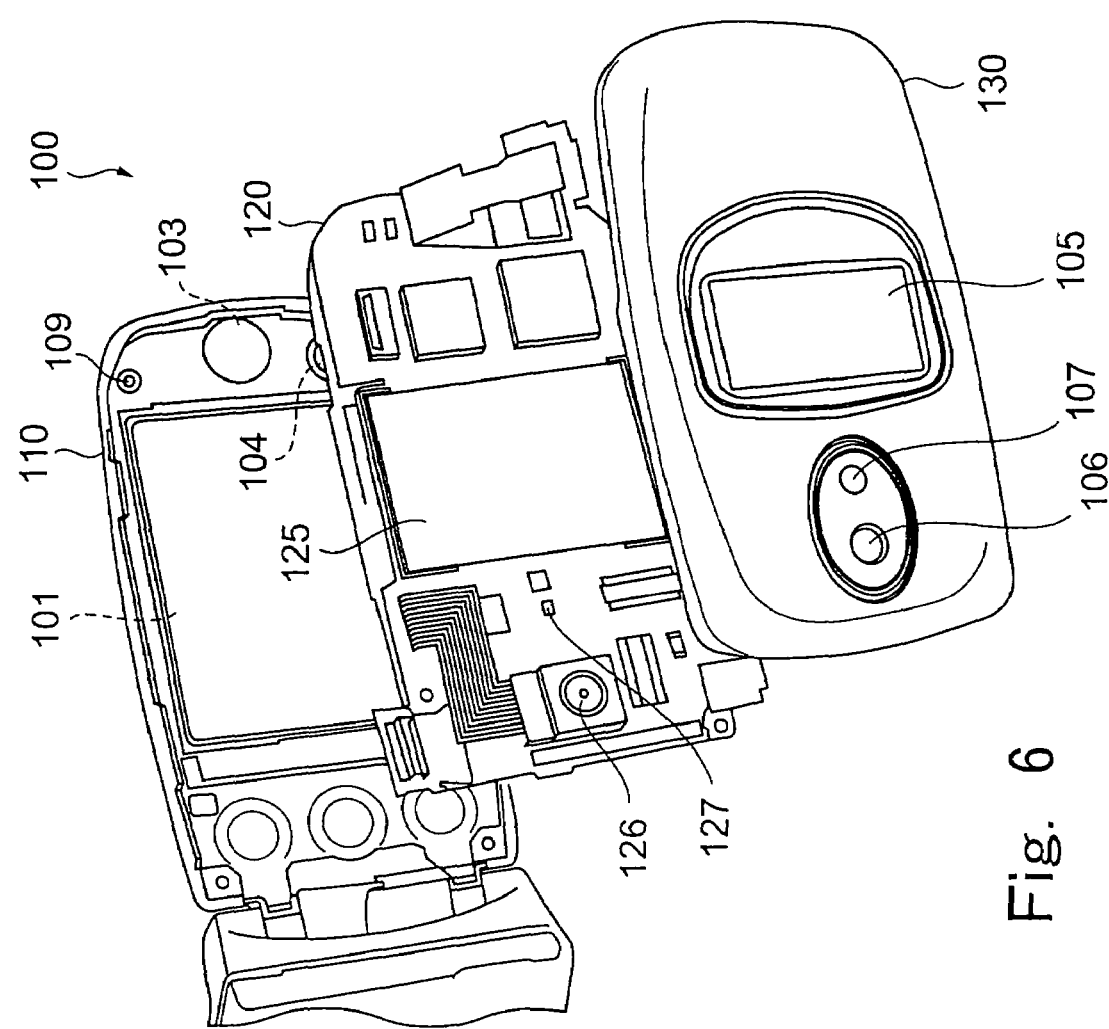
FIG. 6 is an exploded perspective view of the upside housing of the portable telephone shown in FIGS. 1 to 4.

FIGS. 5 and 6 are exploded perspective views of the upside housing of the portable telephone shown in FIGS. 1 to 4.

The upside housing 100 includes an inside cover 110, an assembly 120 and an outside cover 130, and has a structure for sandwiching the assembly 120 having a number of parts built therein between the inside cover 110 and outside cover 130.

As shown in FIG. 5, the assembly 120 has a liquid crystal display screen 121 provided at a position inside the display window 101 of the inside cover 110. And it has a receiver 123 for receiving a sound signal and producing a sound provided at a position equivalent to the inside of the ear piece 103 of the inside cover 110, and also has an in-camera 124 provided at a position equivalent to the inside of the shooting window 104 of the inside cover 110. Furthermore, the assembly 120 has contacts 122 for being turned on and off by pushing the push buttons 102, which are provided at positions equivalent to the insides of the three push buttons 102 provided on the inside cover 110.

As shown in FIG. 6, the assembly 120 also has a liquid crystal display screen 125, an out-camera 126 and an LED 127 that are provided at positions equivalent to the insides of the display window 105, shooting window 106 and lighting section 107 of the outside cover 130 respectively.

The assembly 120 has a number of electronic circuit modules and so on other than the parts provided therein.

Next, the structure of the assembly 120 of the upside housing 100 will be described by centering on a mounting structure of the out-camera 126.

Figure 7:
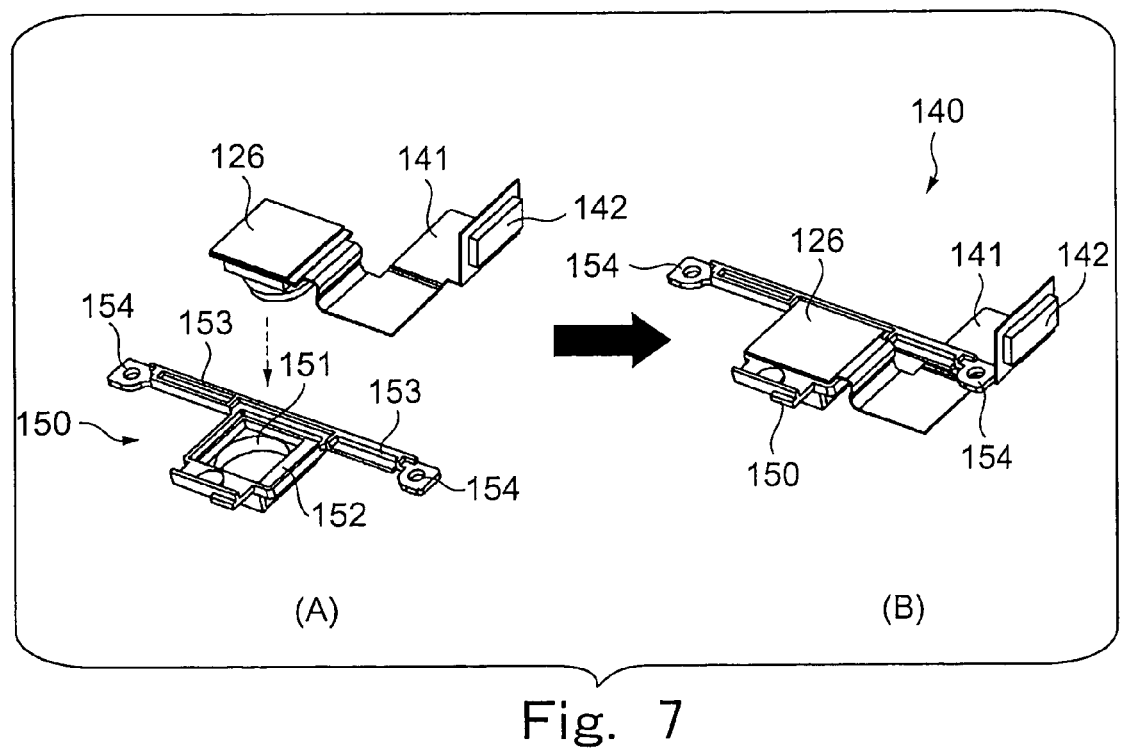
FIG. 7 is a perspective view showing an out-camera and an out-camera holder.

FIG. 7 is a perspective view showing the out-camera and an out-camera holder. Here, Part (A) of FIG. 7 is a perspective view separately showing the out-camera and out-camera holder, and Part (B) of FIG. 7 is a perspective view showing a state of accommodating the out-camera in the out-camera holder.

The out-camera 126 has a lens and an image pickup device that is not shown built therein. The out-camera 126 is connected to a flexible board 141 having wiring for conveying an image signal obtained by that image pickup device, and the flexible board 141 further has a connector 142 mounted thereon. The out-camera 126 faces downward in FIG. 7.

An out-camera holder 150 has an opening 151 for the out-camera 126 to look in provided in the middle thereof, and a wall section 152 is mounted surrounding the opening 151. As shown in Part (B) of FIG. 7, the out-camera 126 is accommodated in a portion surrounded by the wall section 152, and the wall section 152 supports the out-camera 126 by surrounding it. The out-camera holder 150 has two arm sections 153 extended on both sides, and mounting holes 154 are provided at ends of the two arm sections 153.

Figure 8:
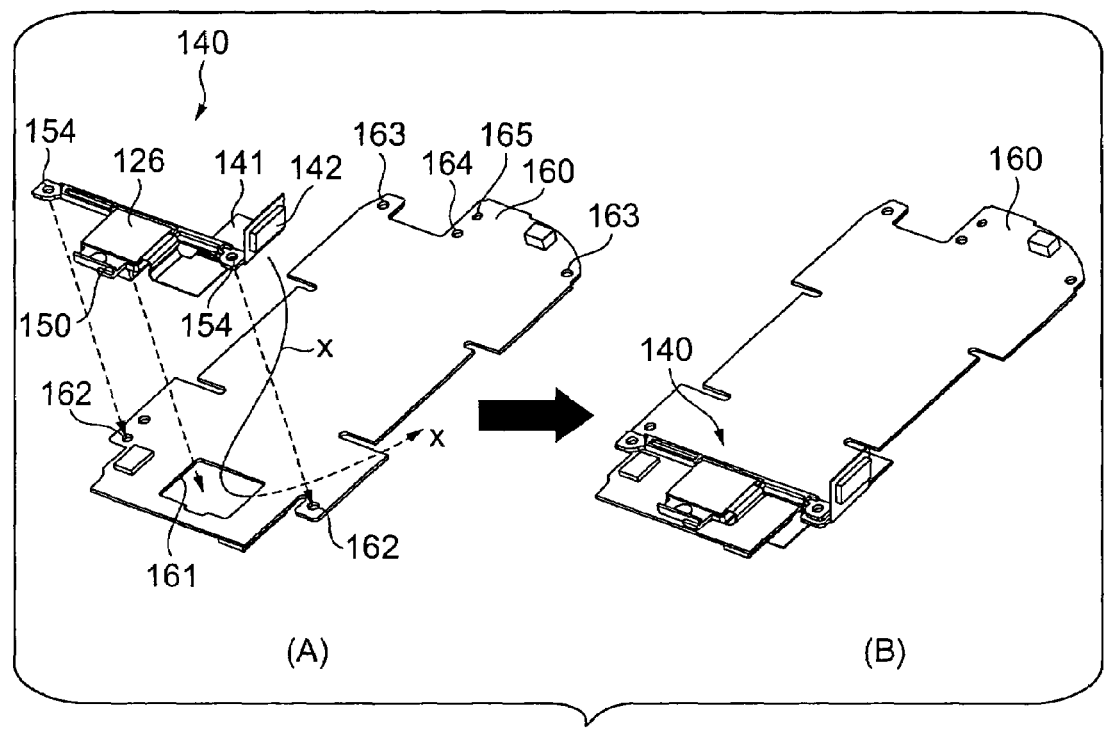
FIG. 8 is a perspective view showing a camera assembly consisting of an out-camera and an out-camera holder and a circuit board.

FIG. 8 is a perspective view showing a camera assembly including the out-camera and out-camera holder and a circuit board. Part (A) of FIG. 8 is a perspective view separately showing the camera assembly including the out-camera and out-camera holder and the circuit board. Part (B) of FIG. 8 is a perspective view showing a state of mounting the camera assembly on the circuit board.

A circuit board 160 has an opening 161 for placing the out-camera, mounting holes 162, 163 and 164 and a positioning hole 165 provided thereon.

Instead of the opening 161, the circuit board 160 may have a notch formed by extending the opening 161 to one side of the circuit board 160. However, a description will be continued here by assuming that the circuit board 160 has the opening 161 formed thereon.

Here, the mounting hole 162 is provided at a position to overlap the mounting hole 154 of the out-camera holder 150 when a camera assembly 140 is placed to have the out-camera 126 look out of the opening 161.

When placing the camera assembly 140 on the circuit board 160, the flexible board 141 goes down through the opening 161 and is placed through the backside of the circuit board 160 as shown by an arrow x in Part (A) of FIG. 8.

Figure 9:
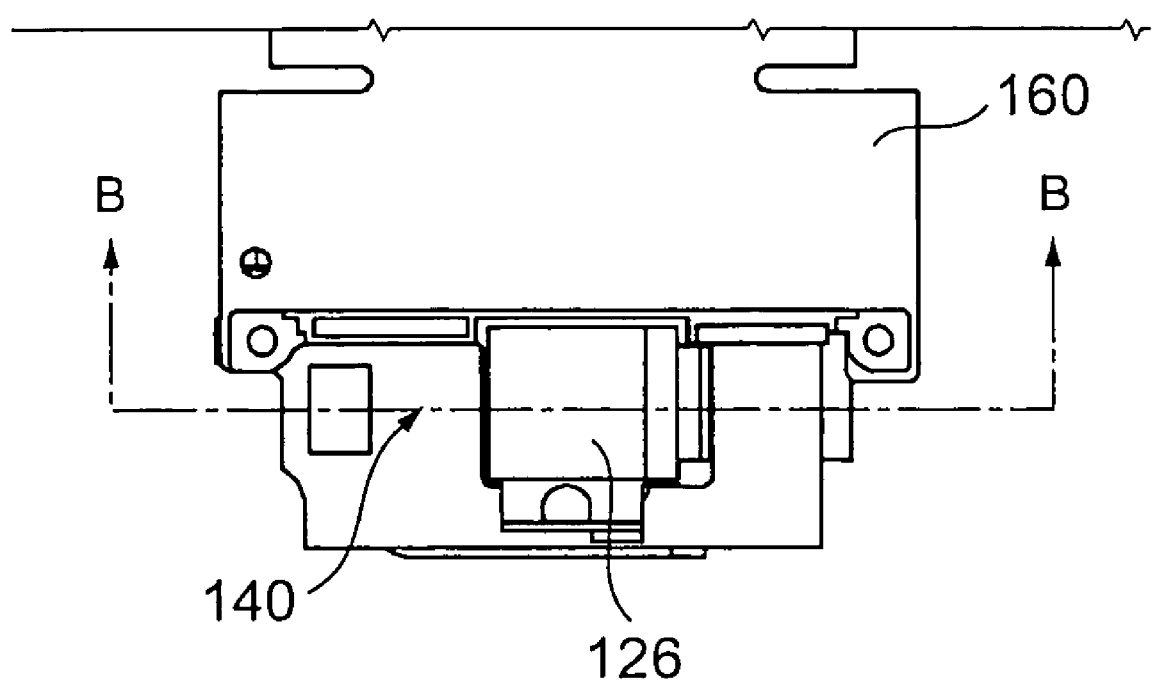
FIG. 9 is a plan view showing the camera assembly placed on the circuit board.
Figure 10:
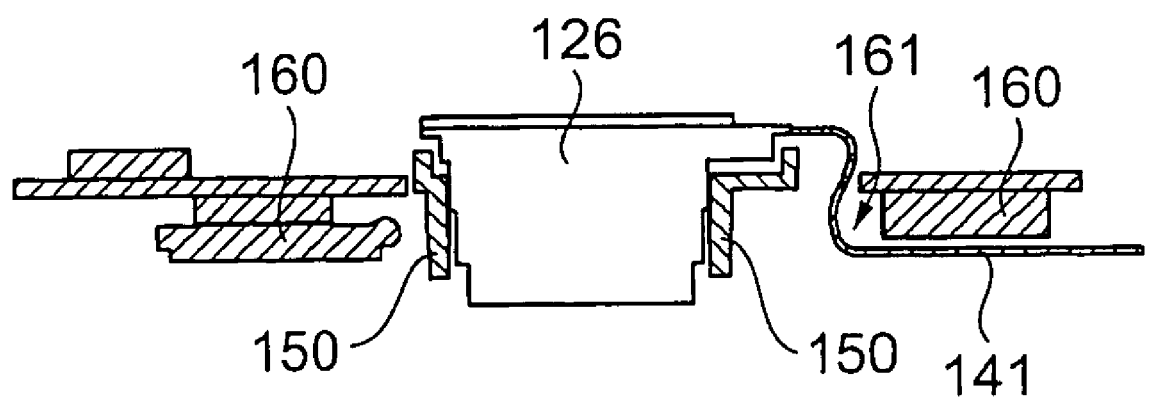
FIG. 10 is a sectional view along an arrow B to B shown in FIG. 9.

FIG. 9 is a plan view showing the camera assembly placed on the circuit board. FIG. 10 is a sectional view along an arrow B-B shown in FIG. 9.

FIG. 10 shows how the flexible board 141 extended from the out-camera 126 goes down through the opening 161 of the circuit board 160 and runs through the backside of the circuit board 160.

Figure 11:
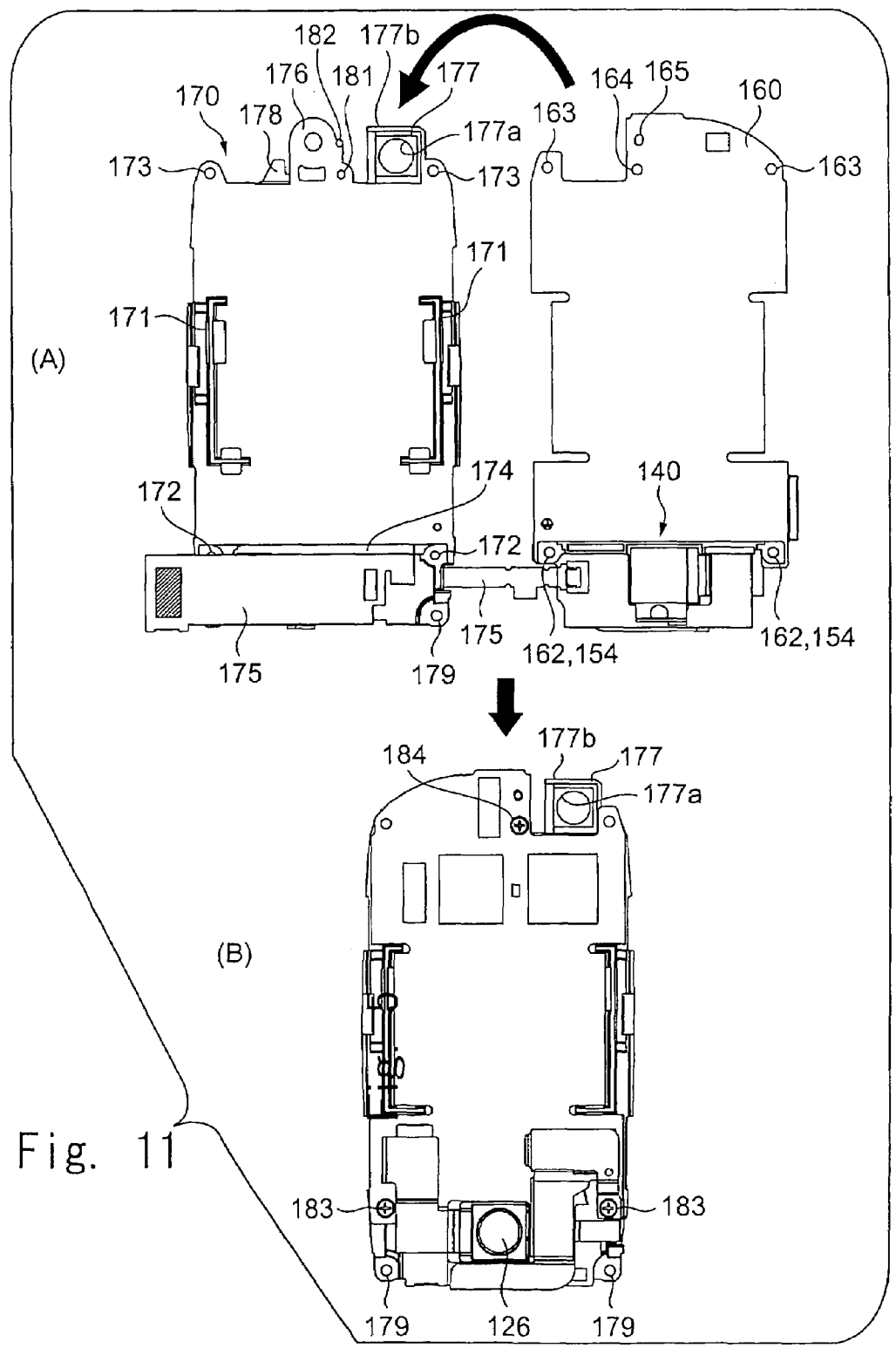
FIG. 11 is a diagram showing the circuit board having the camera assembly mounted thereon and a chassis on which the circuit board is to be fixed.

FIG. 11 is a diagram showing the circuit board having the camera assembly mounted thereon and the chassis on which the circuit board is to be fixed. Part (A) of FIG. 11 is a diagram separately showing the circuit board and chassis. Part (B) of FIG. 11 is a diagram showing the assembly having the circuit board mounted on the chassis.

Figure 12:
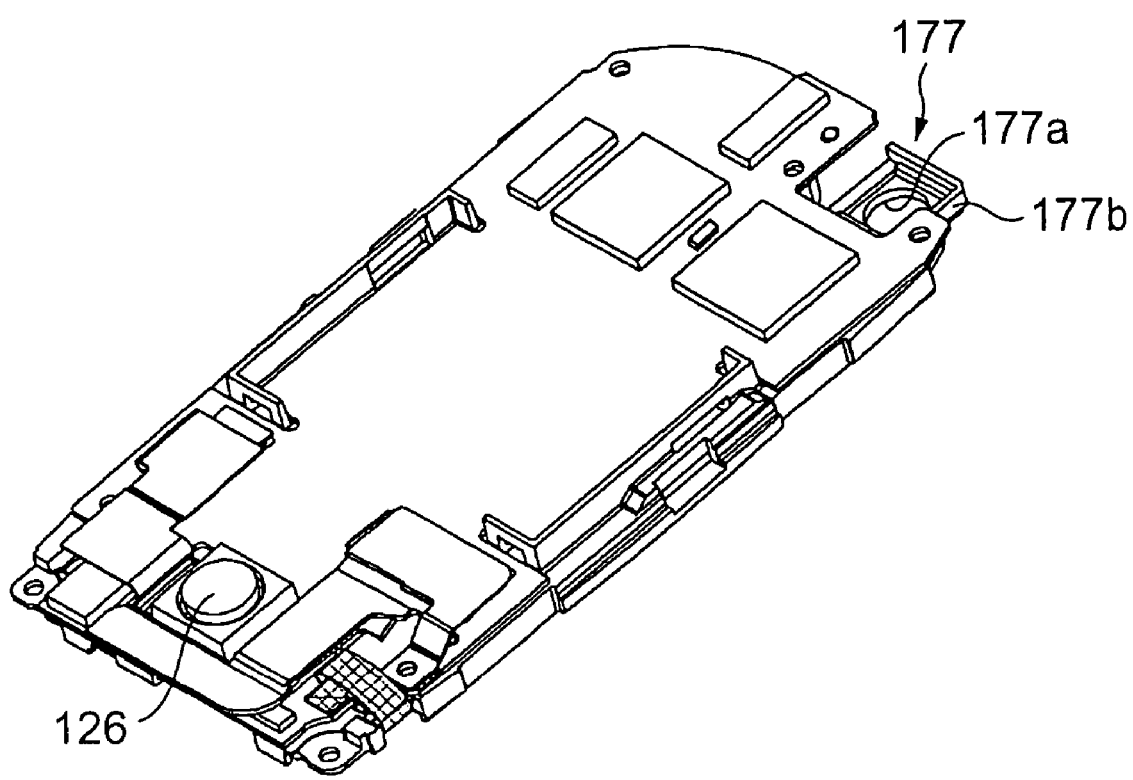
FIG. 12 is a perspective view of the assembly having the circuit board mounted on the chassis.

FIG. 12 is a perspective view of the assembly having the circuit board mounted on the chassis.

A chassis 170 is made by die-casting a magnesium alloy. The chassis 170 has walls 171 standing thereon and also has screw holes 172, mounting holes 173, a screw hole 181 and a positioning projection 182 provided thereon. The chassis 170 also has a long and thin slit 174 penetrating a front face and a rear face provided thereon.

As shown in FIG. 5, the chassis 170 has three contacts 122 provided on a rear face to the face shown in Part (A) of FIG. 11, and a flexible board 175 connected to the three contacts 122 goes through the slit 174 and is extended to the face of the chassis 170 shown in FIG. 11. The flexible board 175 is also extended to the circuit board 160 side without going through the slit 174.

Furthermore, the chassis 170 has a receiver fixing section 176 for fixing the receiver 123 (refer to FIG. 5), an in-camera placement section 177 for placing the in-camera 124 (refer to FIG. 5), and a canopy section 178 projecting from a body section of the chassis 170 described later provided thereon.

As shown by the arrow in Part (A) of FIG. 11, the circuit board 160 has the face on the side shown in Part (A) of FIG. 11 placed on the chassis 170 in a direction to contact the face on the side shown in Part (A) of FIG. 11. The two screw holes 172 provided on the chassis 170 are provided on positions overlapping the two mounting holes 162 provided on the circuit board 160 and the two mounting holes 154 provided on the out-camera holder 150. The mounting holes 173, screw hole 181 and positioning projection 182 provided on the chassis 170 are corresponding to the mounting holes 163, 164 and positioning hole 165 provided on the circuit board 160 respectively. If the circuit board is placed on the chassis 170, the positioning projection 182 of the chassis 170 gets into the positioning hole 165 of the circuit board 160 so that the circuit board 160 is screwed on the chassis 170 with screws 183 and 184 shown in Part (B) of FIG. 11. In this case, the out-camera holder 150 and the circuit board 160 are screwed together on the chassis 170. The out-camera 126 set in the out-camera holder 150 has its backside supported by the chassis 170 via the flexible board 175. Thus, the out-camera 126 is supported by the out-camera holder 150 and also directly supported by the chassis 170 so as to be fixed as securely as directly fixing the out-camera 126 on the chassis 170. Here, it is also feasible to render size of the mounting holes 154 of the out-camera holder 150 a little larger so as to fine-tune a mounting position and a posture (angle) of the out-camera 126.

After the circuit board 160 is placed on the chassis 170, the mounting holes 163 other than the mounting holes 162 and 164 of the circuit board 160 screwed on the chassis 170 and the mounting holes 173 out of the mounting holes 173 and 179 on the chassis 170 are screwed at a screw hole 109 (refer to FIG. 6) on the inside cover 110. And the mounting hole 179 on the chassis 170 is screwed at a screw hole 139 on the outside cover 130 with a screw inserted from a mounting hole 108 (refer to FIG. 5) on the inside cover 110.

FIGS. 11 and 12 do not show the receiver 123 and in-camera 124 (refer to FIG. 5). However, the receiver 123 is fixed on the receiver fixing section 176 of the chassis 170, and the in-camera 124 is placed on the in-camera placement section 177 of the chassis 170. The in-camera placement section 177 has an opening 177a for the in-camera to look in provided in the middle, and also has a wall 177b formed in surroundings thereof. And the in-camera 124 is placed in the in-camera placement section 177 of the chassis 170 so as to be directly and strongly held by the chassis 170.

Though it is not shown in FIGS. 11 and 12, the liquid crystal display screen (refer to FIG. 6) facing the outside cover 130 from the top of the circuit board 160 placed on the chassis 170 is placed in an area surrounded by the walls 171 of the chassis 170.

Thus, the circuit board 160 is placed on the chassis 170 and necessary parts are further mounted to constitute the assembly 120 shown in FIGS. 5 and 6.

The assembly 120 is assembled in a state of being sandwiched between the inside cover 110 and the outside cover 130 as previously described so as to constitute the upside housing 100 of the portable telephone.

Figure 13:
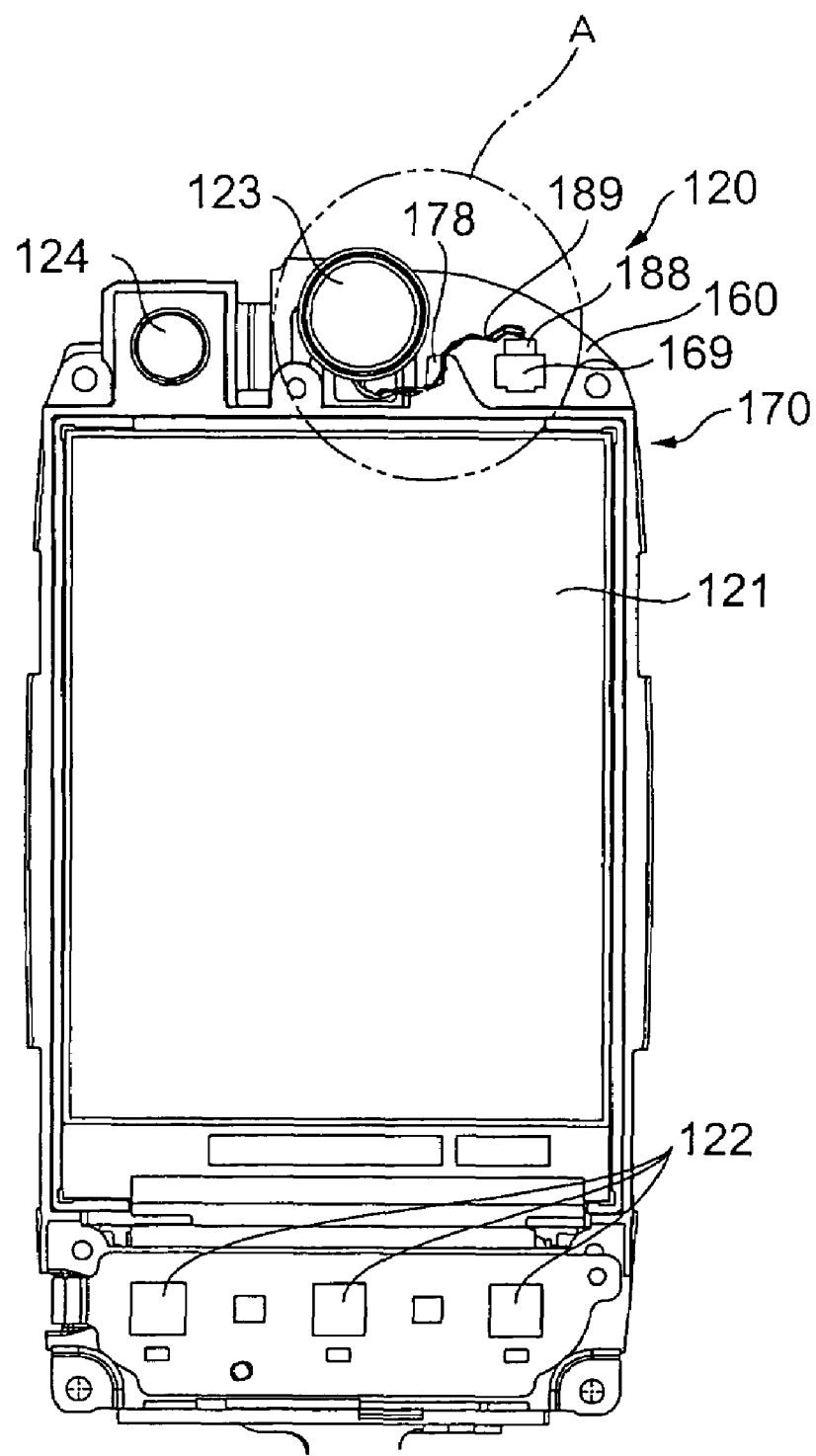
FIG. 13 is a plan view showing the face of the assembly shown in FIGS. 5 and 6 facing an inside cover side.
Figure 14:
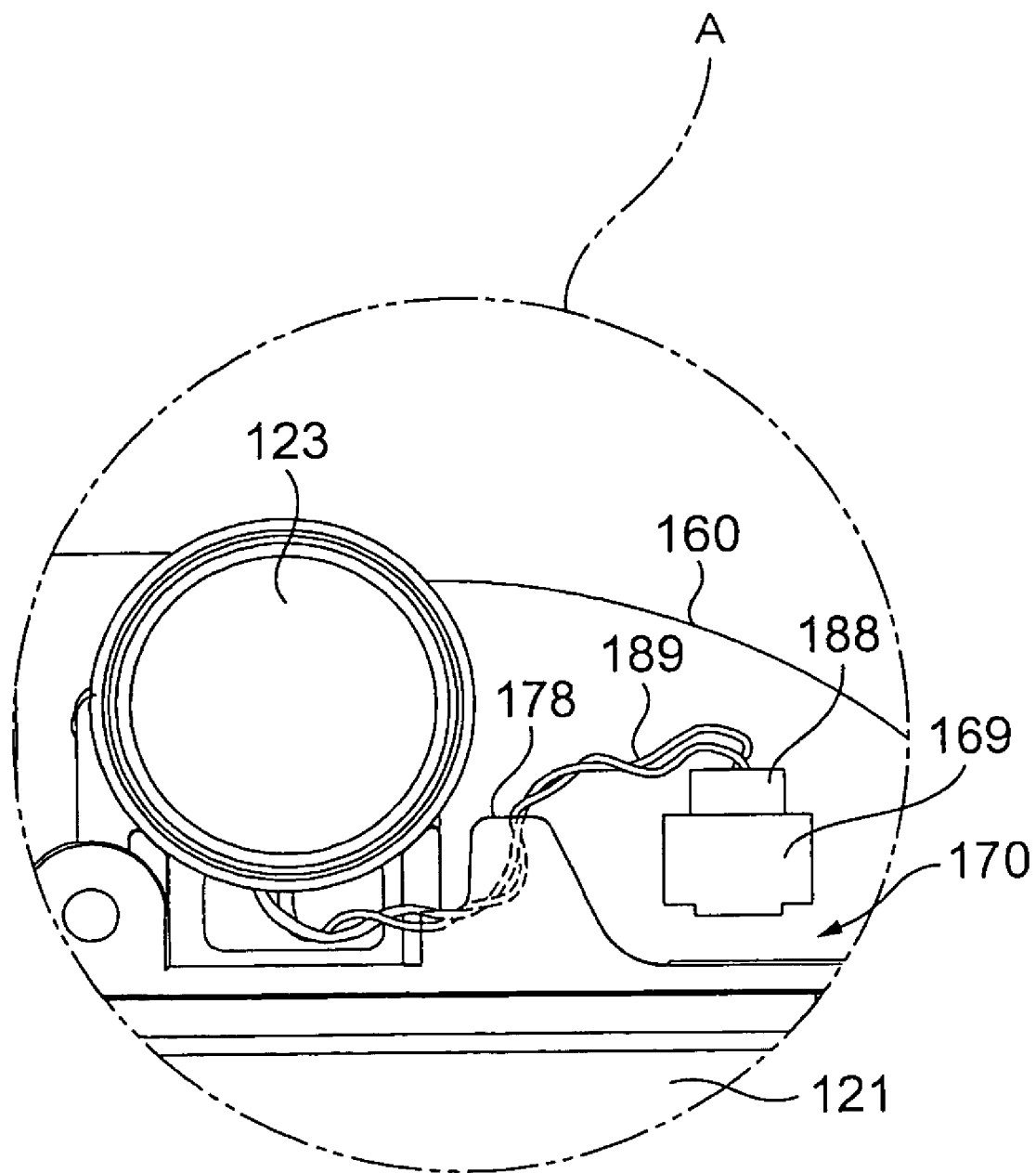
FIG. 14 is an enlarged plan view of the inside of a circle A shown in FIG. 3.

FIG. 13 is a plan view showing the face of the assembly 120 shown in FIGS. 5 and 6 facing the inside cover 110 side. FIG. 14 is an enlarged plan view of the inside of a circle A shown in FIG. 13.

FIG. 13 shows the liquid crystal display screen 121, three contacts 122, receiver 123, in-camera 124 and so on fixed on the chassis 170.

A lead 189 for conveying the sound signal to the receiver 123 is extended from the receiver 123, and a connector 188 is connected to the end of the lead 189. The connector 188 is connected to a connector 169 on the circuit board 160. Here, the lead 189 is reasonably long to facilitate assembly work for fitting the connector 188 at its end to the connector 169 on the circuit board 160. If the assembly work thereafter is performed with the lead 189 remaining as-is on the liquid crystal display screen 121, the assembly becomes incomplete. Thus, the projecting canopy section 178 for regulating a wiring position of the lead 189 is provided on the chassis 170 for fixing the receiver 123 so as to hold down the lead 189 with the canopy section 178. It is possible, by providing such a canopy section 178, to wire the lead 189 at a proper position not interfering with the assembly.

Next, a description will be given as to the structure of the downside housing 200 (refer to FIGS. 1 and 2) of the portable telephone 10 described here.

Figure 15:
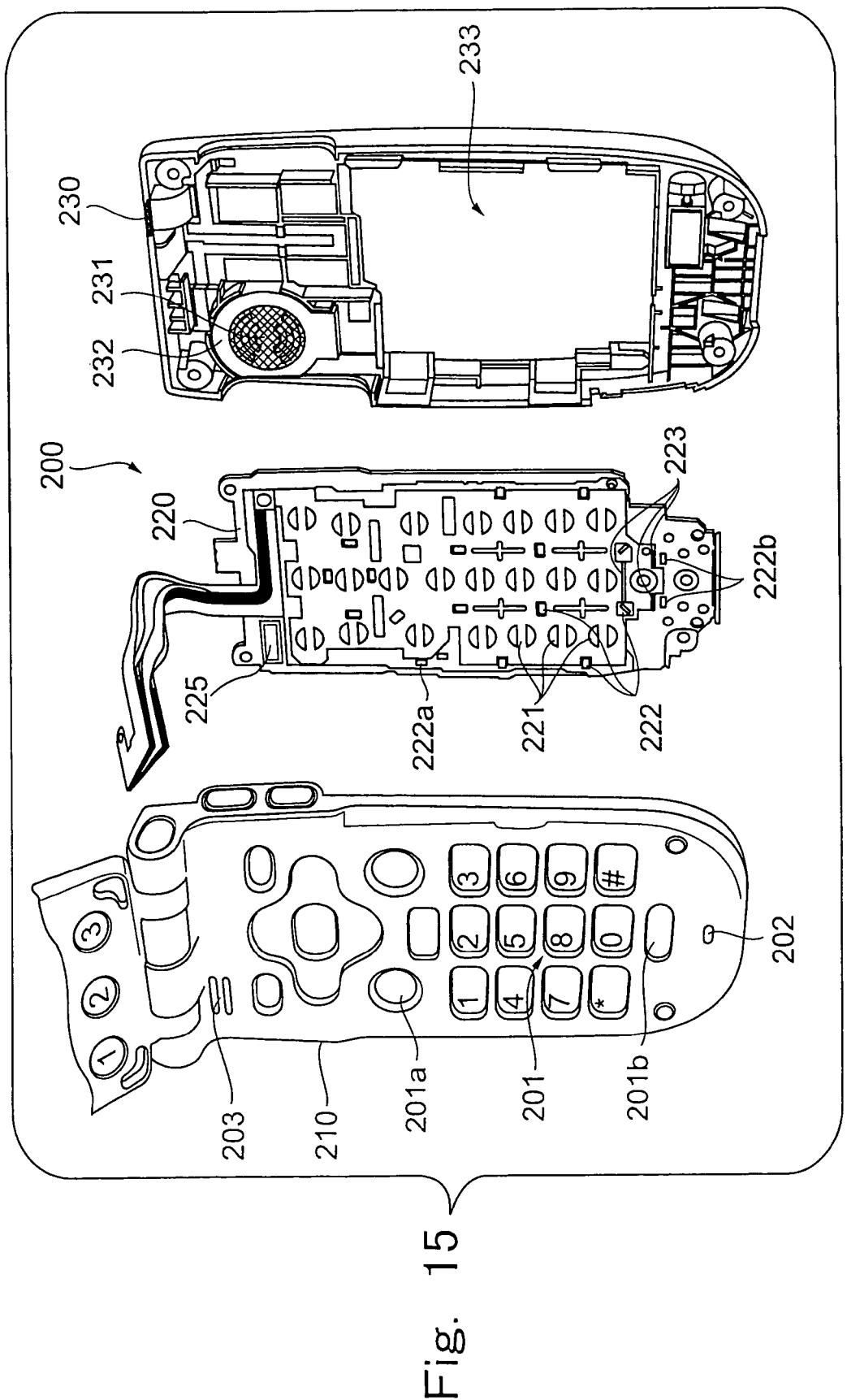
FIG. 15 is an exploded perspective view of the downside housing of the portable telephone shown in FIGS. 1 to 4.
Figure 16:
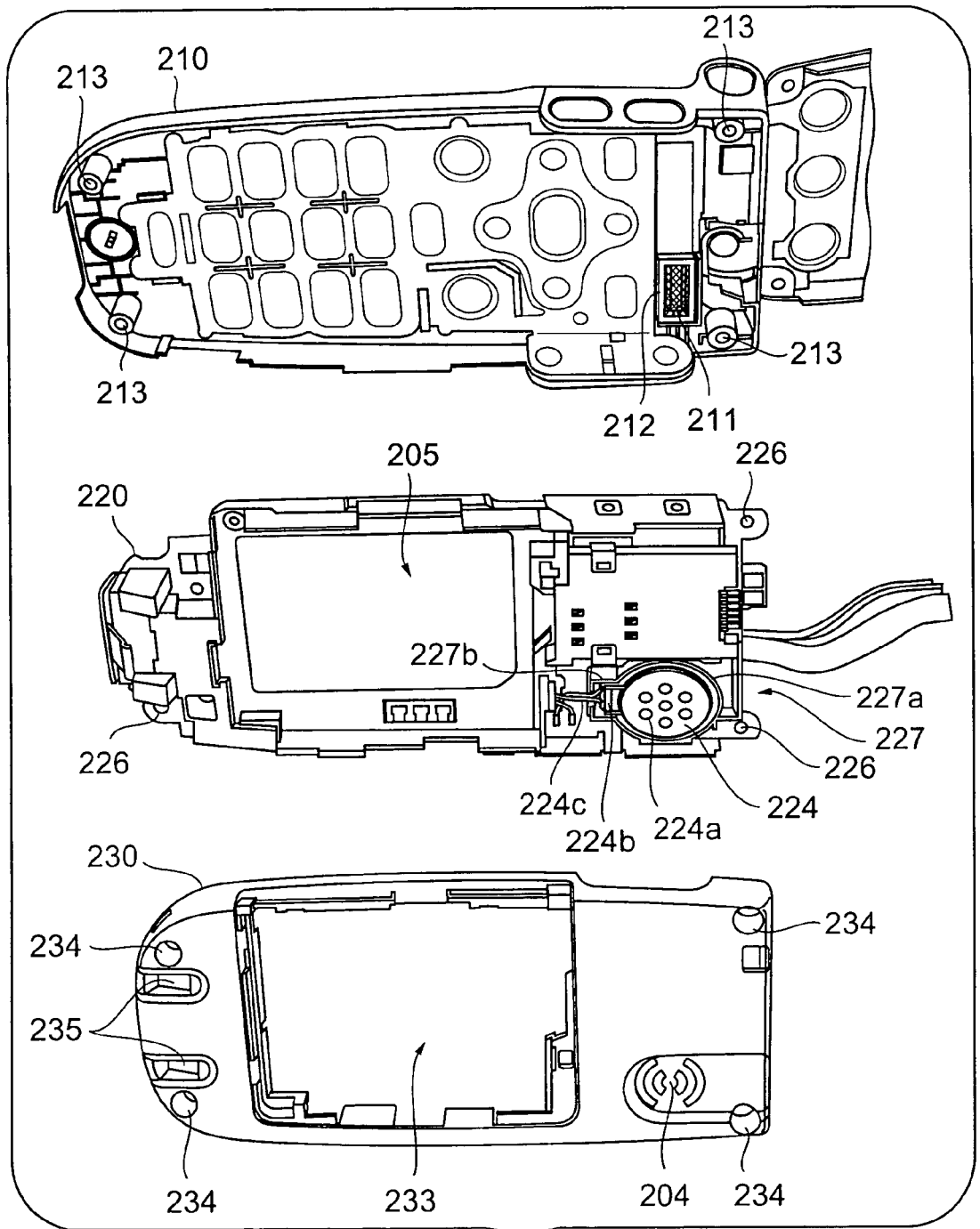
FIG. 16 is an exploded perspective view of the downside housing of the portable telephone shown in FIGS. 1 to 4.

FIGS. 15 and 16 are exploded perspective views of the downside housing of the portable telephone shown in FIGS. 1 to 4.

As with the upside housing 100 (refer to FIGS. 5 and 6) described so far, the downside housing 200 also includes an inside cover 210, an assembly 220 and an outside cover 230, and has a structure for sandwiching the assembly 220 having a number of parts built therein with the inside cover 210 and outside cover 230.

The assembly 220 is plate-like as a whole, and contacts 221 to be turned on by pushing the push buttons are placed at positions corresponding to multiple push buttons 201 provided on the inside cover 210 respectively. And multiple LEDs 222 for lighting up the push buttons 201 are dispersedly placed. One LED 222a of the multiple LEDs 222 lights up a call button 201a out of the multiple push buttons 201, which is equivalent to picking up a receiver of a conventional telephone. Another LED 222b lights up a call button 201b out of the multiple push buttons 201. The multiple LEDs 222 which are dispersedly placed emit light all together and thereby light up the multiple push buttons 201 all together.

According to this embodiment, placement of the LEDs 222 is determined so that, on lighting up the multiple push buttons 201 all together, the multiple push buttons 201 including the call buttons 201a and 201b will light up all together without having the LEDs 222a and 222b for lighting up only the call buttons 201a and 201b emit light. And according to this embodiment, the LEDs 222 except the LEDs 222a and 222b emit light on lighting up the multiple push buttons 201 all together. However, it is also feasible, as the placement of the LEDs, to have the call buttons 201a and 201b lighted up by the LEDs 222a and 222b on lighting up the multiple push buttons 201 all together so as to have the LEDs 222 including the LEDs 222a and 222b emit light on lighting up the multiple push buttons 201 all together.

Here, the call button 201a as one of the two call buttons 201a and 201b is the push button to be pushed when making an ordinary call only with voice. The other call button 201b is the push button to be pushed when making a video-phone call accompanied by image communication. In FIG. 15, a light shielding member 223 is provided as if surrounding the portion corresponding to the call button 201b for videophone of the assembly 220. This is intended to light up the call button 201b when the LED 222b emits light and prevent the other push buttons from lighting up due to the light leaked from the LED 222b. Details will be described later.

The assembly 220 has an opening 225 formed thereon for the sake of emitting the voice from the backside of the speaker (refer to FIG. 16) from the assembly 220. The voice emitted from the opening 225 is outputted to the outside of the portable telephone from the sound outlet 203 provided on the inside cover 210.

The outside cover 230 shown in FIG. 15 has an opening 233 for accommodating the battery formed thereon, and a mesh 231 is adhered to the inside of the sound outlet 204 (refer to FIGS. 2, 4 and 16) for emitting the voice from the front of the speaker (refer to FIG. 16) to the outside of the housing. The mesh 231 plays a role of emitting the voice from the speaker to the outside from the sound outlet 204 and preventing dust of the outside from entering into the housing.

A gasket 232 is adhered as if surrounding the sound outlet 204 (refer to FIGS. 2, 4 and 16) having the mesh 231 adhered thereto. The gasket 232 is intended to prevent a sound leak from around the speaker. Details of the gasket 232 will also be described later.

As shown in FIG. 16, on the inner face of the inside cover 210, there are a mesh 211 adhered to the inside of the sound outlet 203 (refer to FIGS. 1 and 15) and a gasket 212 adhered thereto by surrounding the mesh 211 provided. The gasket 212 clogs up the surroundings of the opening 225 of the assembly 220 shown in FIG. 15 to prevent the voice emitted from the opening 225 to leak to any portion other than the sound outlet 203. The inside cover 210 also has screw holes 213 for screws provided thereon.

As shown in FIG. 16, the assembly 220 has a speaker 224 mounted thereon with its front exposed, and also has a battery accommodating section 205 for accommodating the battery (not shown). Furthermore, the assembly 220 has mounting holes 226 provided thereon.

Here, the speaker 224 mounted on the assembly 220 has a sound producing section 224a which is almost circular and a connecting section 224b to which a lead 224c for conveying the sound signal to the sound producing section 224a is connected. And a speaker accommodating section 227 for accommodating the speaker 224 of the assembly 220 has a form matching with the form of the speaker 224, wherein a circular section 227a for accommodating the circular sound producing section 224a of the speaker 224 is connected to a rectangular section 227b for connecting the connecting section 224b of the speaker 224.

Furthermore, as shown in FIG. 16, the outside cover 230 has the sound outlet 204 and the opening 233 for accommodating the battery described so far provided thereon, and further has mounting holes 234 and battery charging electrodes 235 provided thereon. To assemble the inside cover 210, assembly 220 and outside cover 230, the assembly 220 is sandwiched between the inside cover 210 and outside cover 230, and screws are inserted into the mounting holes 234 of the outside cover 230 and mounting holes 226 of the assembly 220 from the mounting holes 234 side so as to be screwed in the screw holes 213 of the inside cover 210.

Figure 17:
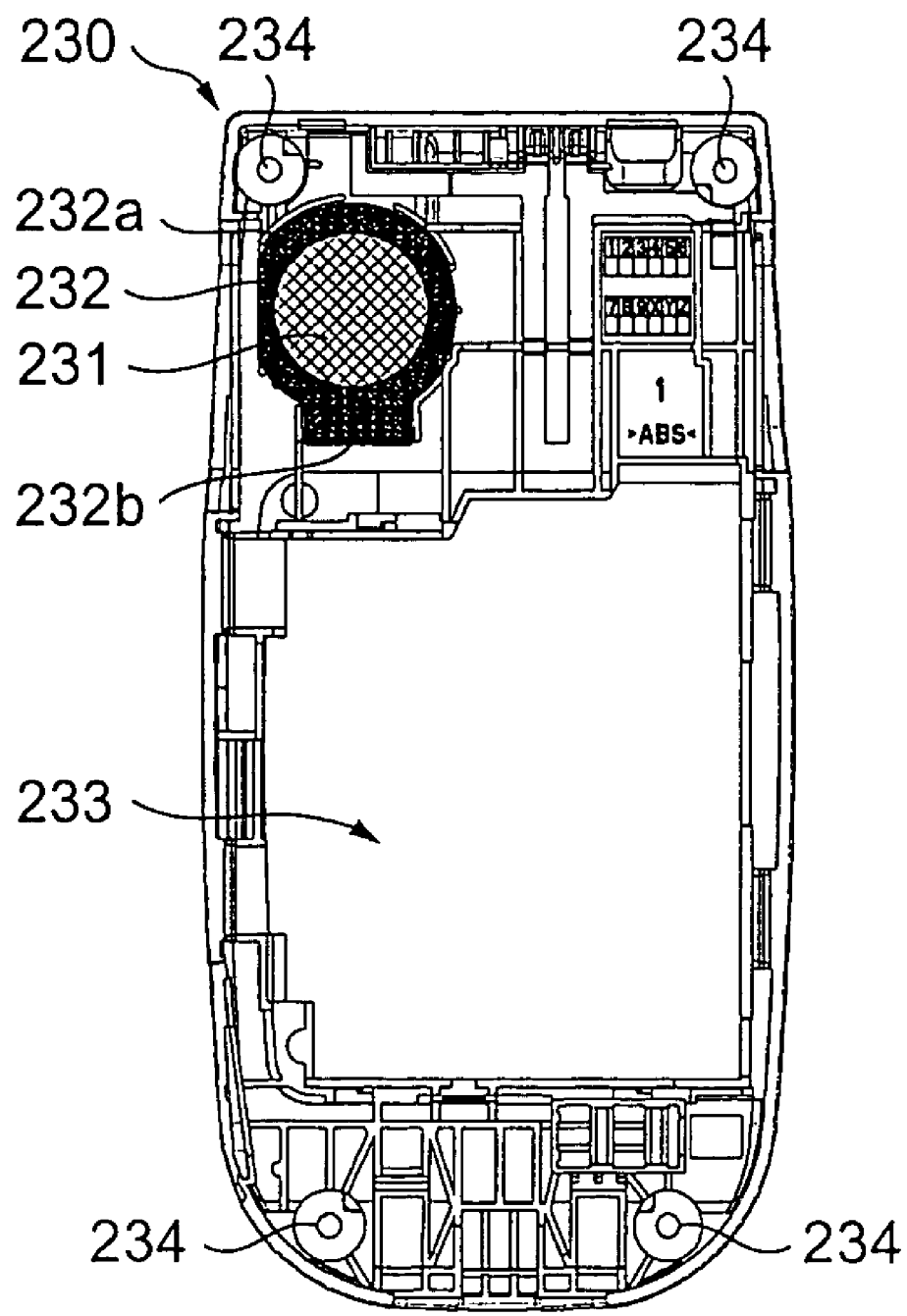
FIG. 17 is a plan view showing the inner face of an outside cover constituting the downside housing.

FIG. 17 is a plan view showing the inner face of the outside cover 230 (refer to FIGS. 5 and 6) constituting the downside housing 200 (refer to FIGS. 1 and 2).

Here, the mesh 231 is adhered to the portion to which the front face of the sound producing section 224a of the speaker 224 (refer to FIG. 16) is applied as previously described, and the gasket 232 is adhered to the surroundings of the mesh 231. The gasket 232 has a circular portion 232*a* and a rectangular portion 232*b* projecting from the circular portion. The circular portion 232*a* of the gasket 232 covers the surroundings of the sound producing section 224*a* (refer to FIG. 16) of the speaker 224, and is intended to prevent occurrence of unpleasant noise due to reduction in sound pressure and resonance caused by the voice emitted from the sound producing section 224*a* leaking to any portion other than the sound outlet 204 (refer to FIG. 16) having the mesh 231 adhered thereto.

The rectangular portion 232*b* of the gasket 232 plays a role of clogging up the rectangular section 227*b* having the connecting section 224*b* of the speaker 224 placed thereon of the speaker accommodating section 227 shown in FIG. 16 and acoustically separating a space formed on the backside of the speaker 224 (described later) from the front face of the sound producing section 224*a* in collaboration with the circular portion 232*a*. Details will be described later.

FIG. 17 shows the opening 233 for accommodating the battery and the mounting holes 234 for screws as previously described.

Figure 18:
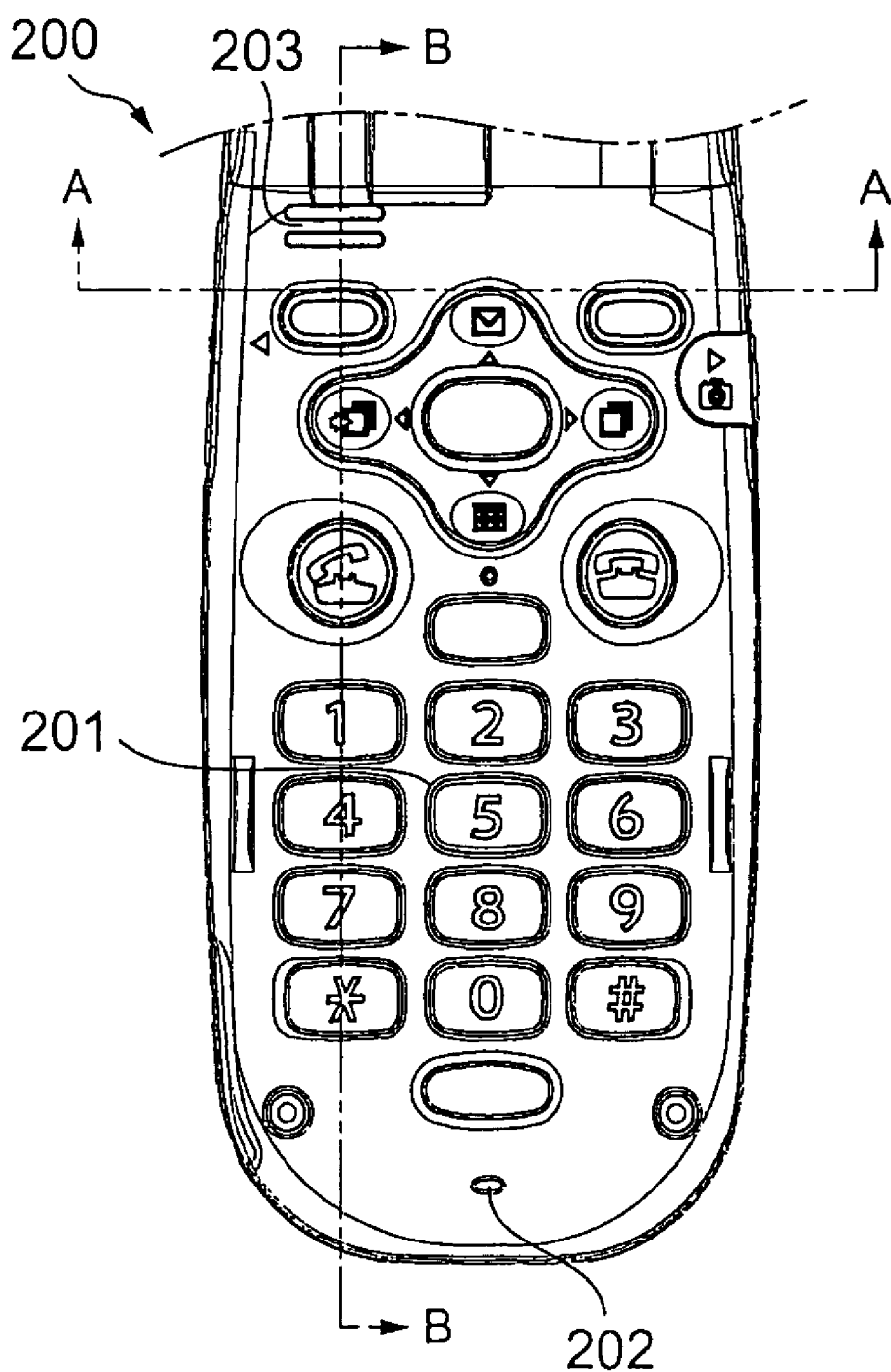
FIG. 18 is a plan view showing the downside housing.
Figure 19:
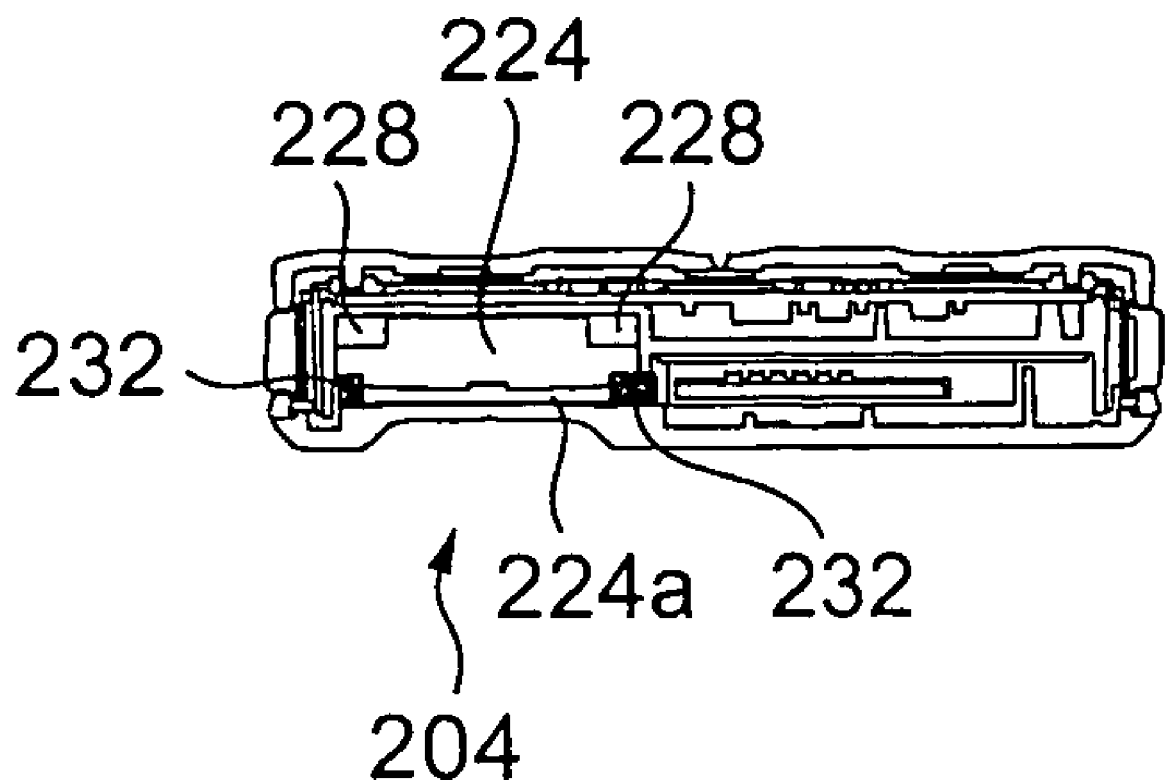
FIG. 19 is a sectional view along the arrow A to A shown in FIG. 18.
Figure 20:
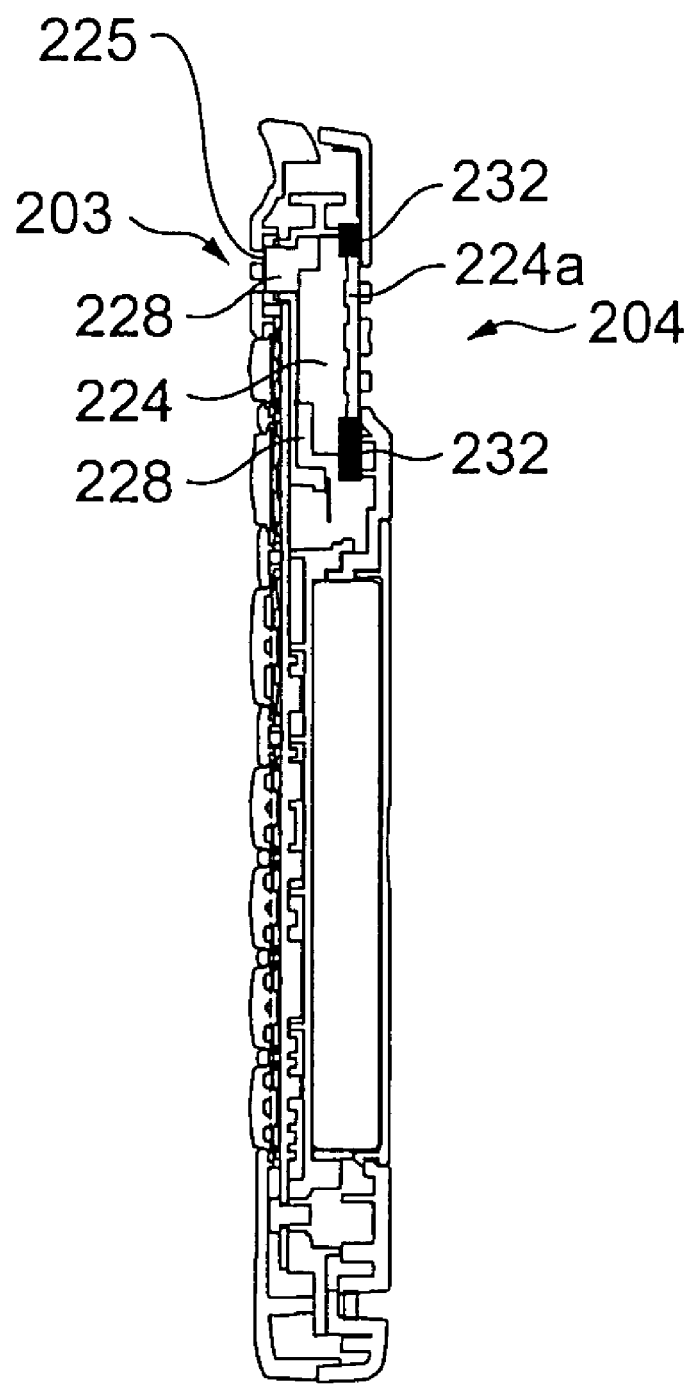
FIG. 20 is a sectional view along the arrow B to B shown in FIG. 18.

FIG. 18 is a plan view showing the downside housing. FIG. 19 is a sectional view along an arrow A to A shown in FIG. 18. FIG. 20 is a sectional view along an arrow B to B shown in FIG. 18.

FIG. 18 is a diagram for showing lines of sections in FIGS. 19 and 20, and a repeated description of the inner face of the downside housing will be omitted. The structure related to the sound outlet 203 will be described below.

As shown in FIGS. 19 and 20, the sound producing section 224*a* of the speaker 224 is facing the sound outlet 204 side, and the gasket 232 including the circular portion 232*a* and rectangular portion 232*b* shown in FIG. 17 is sandwiched between the sound outlet 204 and the speaker 224. And some spaces 228 are formed on the backside of the speaker 224 and lead to the opening 225 (refer to FIG. 15) of the assembly 220, where the opening 225 leads to another sound outlet 203. Here, the gasket 232 is intended to prevent the reduction in sound pressure of the voice emitted from the sound outlet 204 and occurrence of the unpleasant noise due to the sound emitted from the sound producing section 224*a* of the speaker 224 leaking to the surroundings. The gasket 232 plays another role, that is, the role of preventing the sound emitted from the sound producing section 224*a* of the speaker 224 from running round to the spaces 228 on the backside of the speaker 224.

In the case of a structure for emitting the sound from the speaker 224 only to the front face of the sound producing section 224*a*, there is no problem even if the sound runs round to the spaces 228. In this case, it is sufficient only if the gasket 232 exists in the circular portion 232*a* surrounding the sound producing section 224*a* of the speaker 224. As opposed to this, in the case of the structure shown here, the sound emitted forward from the sound producing section 224*a* of the speaker 224 is emitted from the sound outlet 204, and the sound emitted on the backside of the speaker 224 is emitted from another sound outlet 203 via the spaces 228. Here, the voice emitted forward from the sound producing section 224*a* of the speaker 224 and the voice emitted from the backside of the speaker 224 to the spaces 228 are mutually in opposite phases, and so they are mutually canceled if the voice emitted from the sound producing section 224*a* runs round to the spaces 228. The sound pressure of the voice emitted from the backside of the speaker 224 into the spaces 228 is not so high from the beginning. Therefore, if this voice is further canceled, only the voice of insufficient sound pressure can be obtained consequently from the sound outlet 203. Here, not only the circular portion 232*a* but also the rectangular portion 232*b* is provided to the gasket 232, and the voice emitted from the sound producing section 224*a* of the speaker 224 is thereby prevented from running round to the spaces 228 on the backside of the speaker 224 so as to emit the voice of sufficient sound pressure also from the sound outlet 203 on the backside of the speaker 224.

Figure 21:
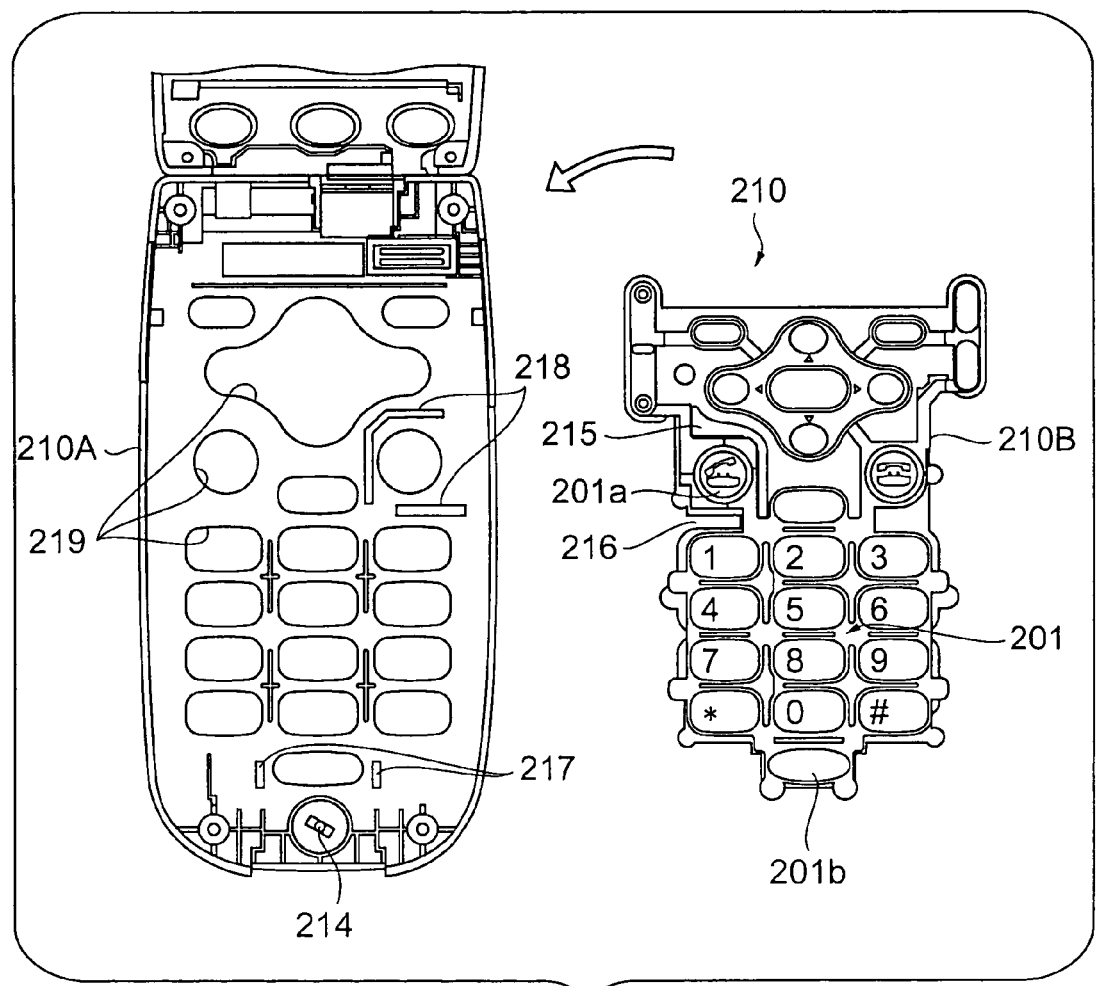
FIG. 21 is a further exploded view showing the inside cover constituting the downside housing.

FIG. 21 is a further exploded view showing the inside cover 210 (refer to FIGS. 5 and 6) constituting the downside housing 200 (refer to FIGS. 1 and 2).

The inside cover 210 includes a frame 210A having holes 219 provided to the portions equivalent to the push buttons and a push button sheet 210B having the push buttons made of a hard material of which locations corresponding to the holes 219 are formed like projections with the push buttons linked by a flexible sheet. The flexible sheet is made of a half-transparent material, and a material for dispersedly transmitting light is used for the push buttons. As shown by the arrow in FIG. 21, the push button sheet 210B has the face shown in FIG. 21 placed on the frame 210A in a direction of the frame 210A contacting the face shown in FIG. 21, and the push buttons 201 of the push button sheet 210B are fitted in the holes 219 of the frame 210A.

The frame 210A has a small microphone 214 provided at a position on the backside of the mouthpiece 202 shown in FIG. 1.

The frame 210A has light shielding walls 217 and 218 adhered to the inner face thereof.

The push button sheet 210B has a long hole 215 and a slit 216 formed at the locations corresponding to the light shielding wall 218.

Figure 22:
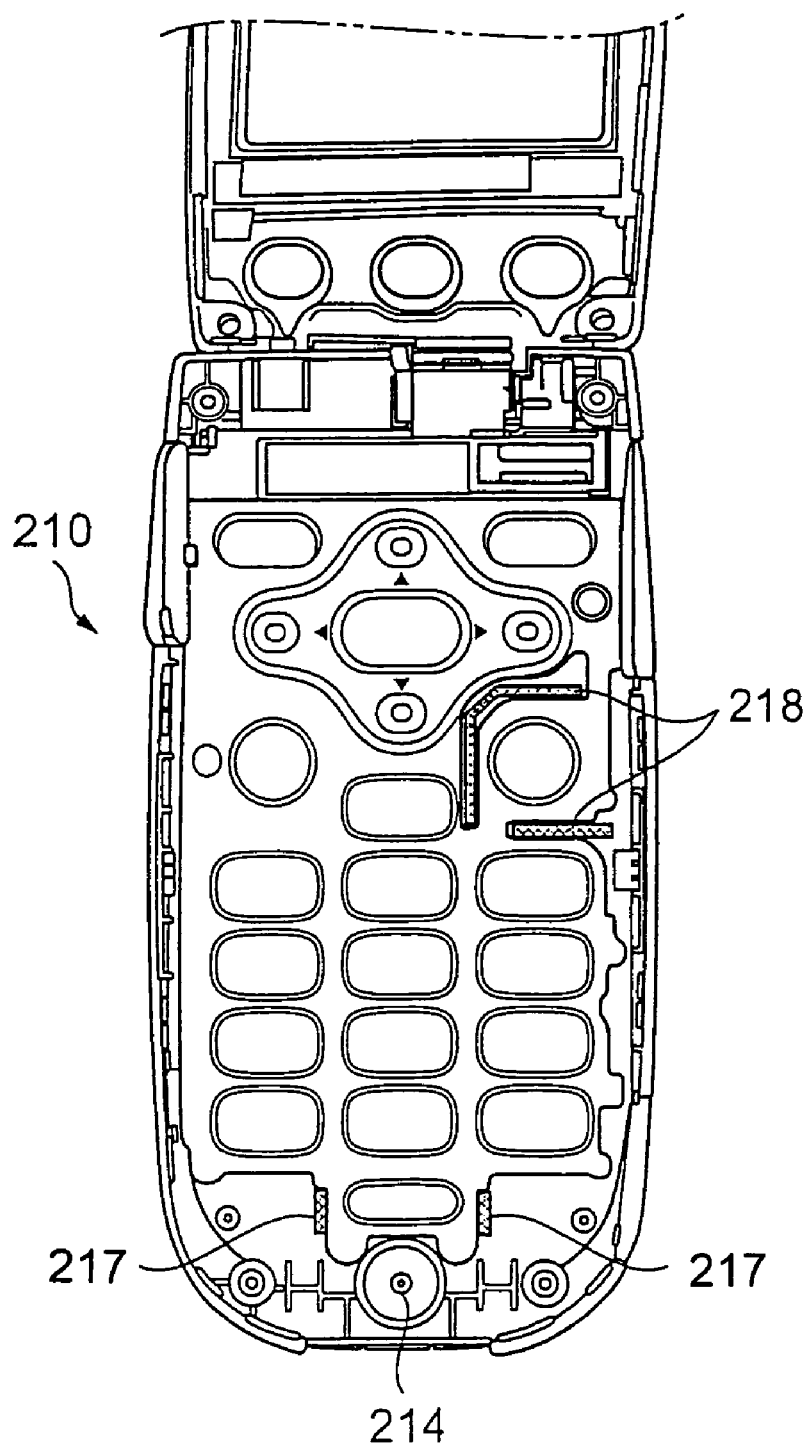
FIG. 22 is a diagram showing the inside cover in a state of placing a push button sheet on a frame.

FIG. 22 is a diagram showing the inner face of the inside cover 210 in a state of placing the push button sheet 210B on the frame 210A.

The light shielding wall 218 is provided at a position surrounding the call button 201*a* of the multiple push buttons 102. The light shielding wall 217 is provided at a position surrounding another call button 201*b* in collaboration with the light shielding wall 223 provided on the assembly 220 (refer to FIG. 15).

The light shielding wall 218 is intended to prevent the push buttons other than the call button 201*a* from lighting up due to a leak of the light from the LED 222*a* as one of the multiple LEDs 222 on the assembly 220 shown in FIG. 15 when the LED 222*a* emits light and lights up only the call button 201*a*.

The light shielding wall 217 surrounds the call button 201*b* in collaboration with the light shielding wall 223 provided on the assembly 220 (refer to FIG. 5), and is intended to prevent the leak of the light to the push buttons other than the call button 201*b* when only the two LEDs 222*b* of the multiple LEDs 222 on the assembly 220 shown in FIG. 5 emit light and light up only the call button 201*b*.

As previously described, if the multiple LEDs 222 except the LEDs 222*a* and 222*b* on the assembly 220 emit light all together, the multiple push buttons including the two call buttons 201*a* and 201*b* lined up on the push button sheet 210B light up all together.

Figure 23:
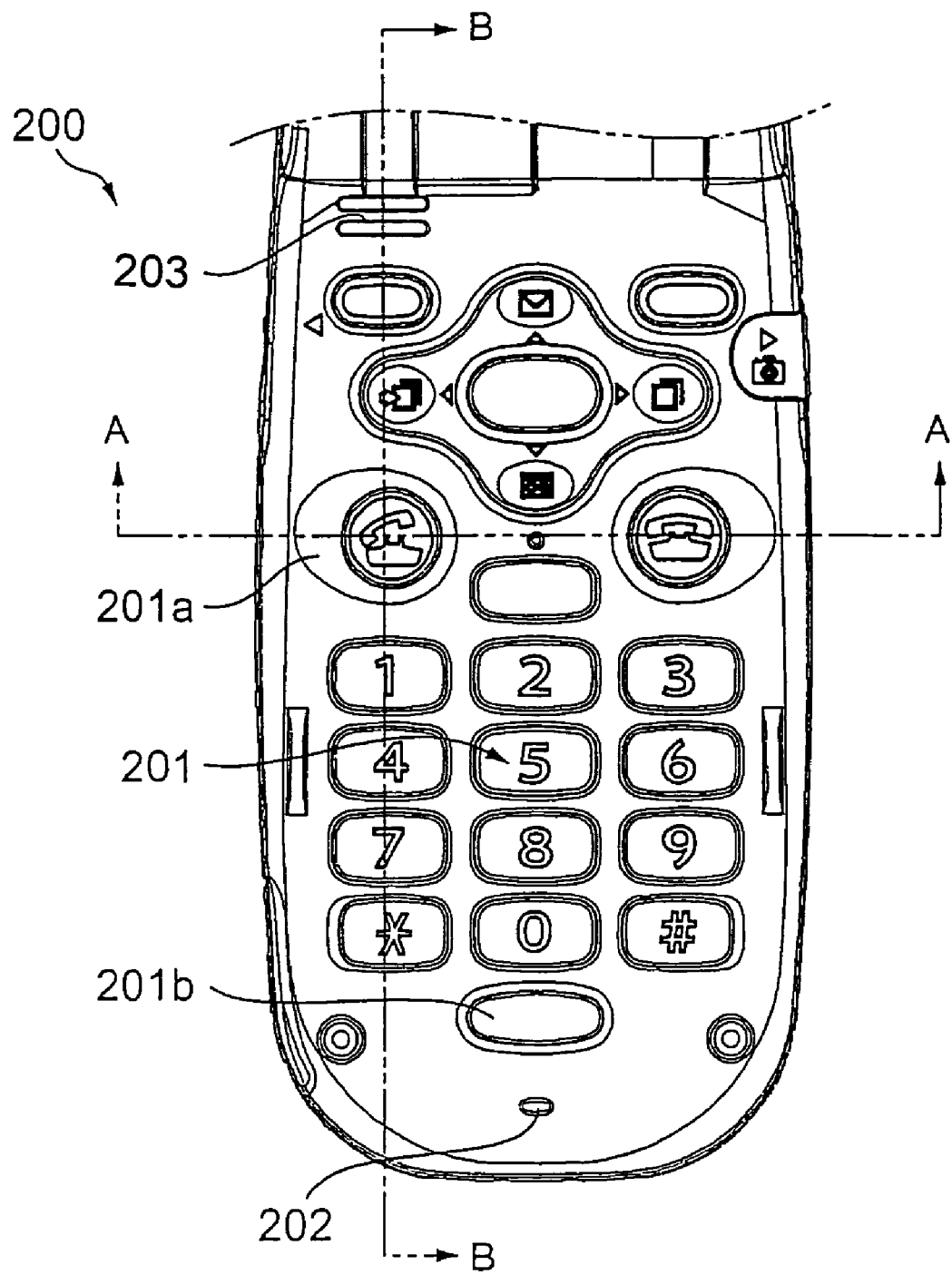
FIG. 23 is a plan view showing the downside housing.
Figure 24:
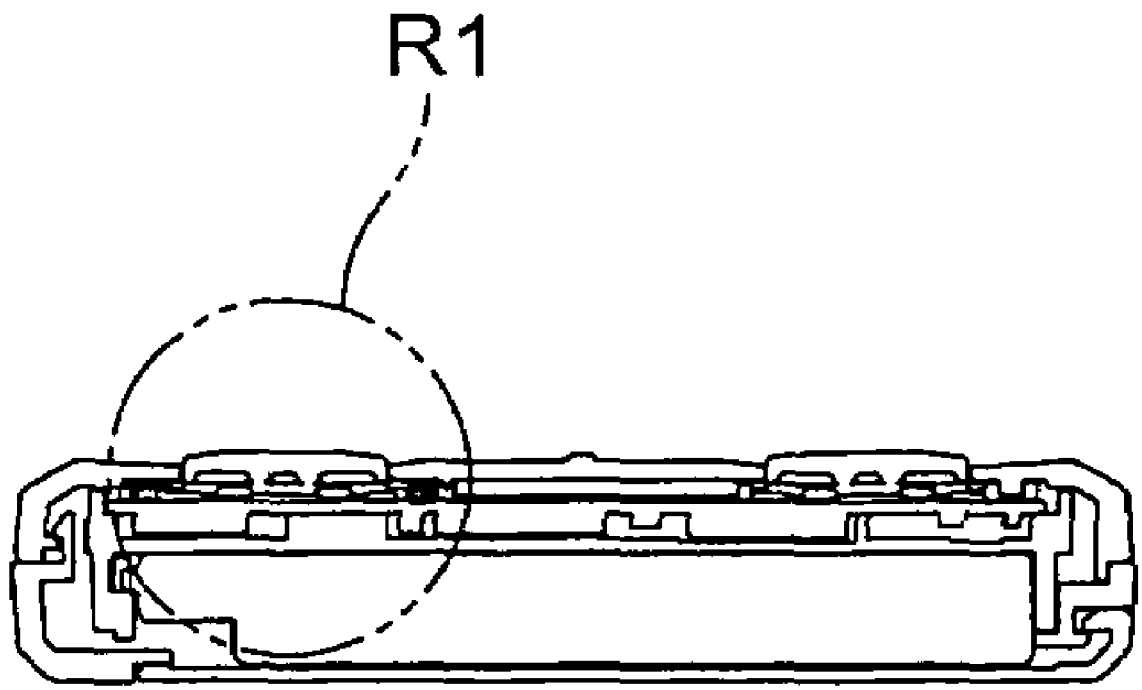
FIG. 24 is a sectional view along the arrow A to A shown in FIG. 23.
Figure 25:
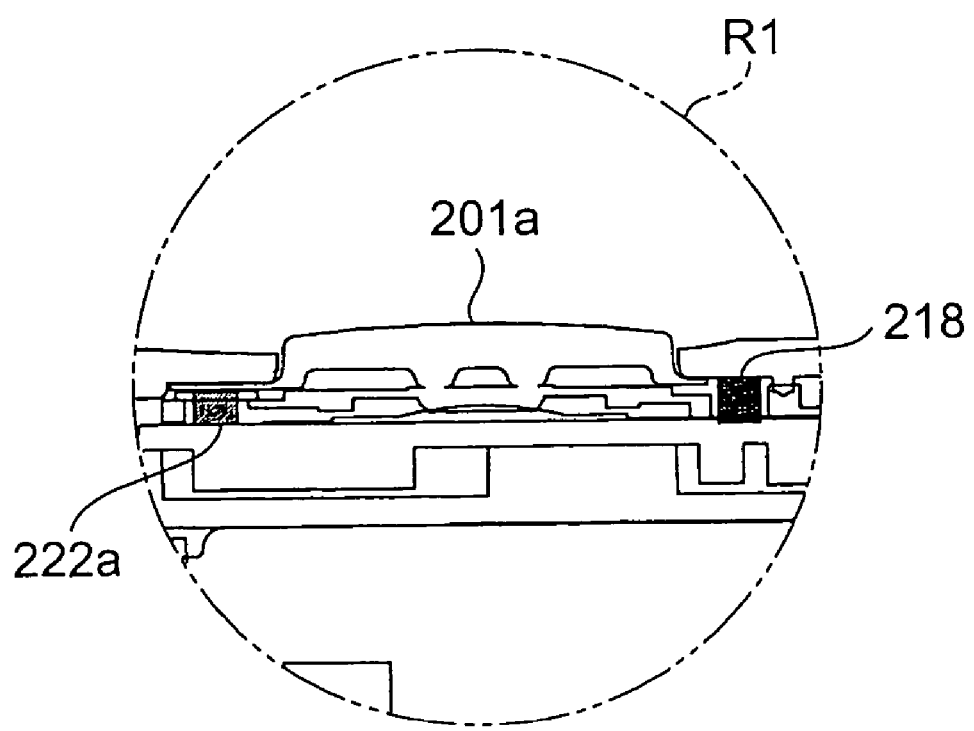
FIG. 25 is a partially enlarged view enlarging and showing the inside of a circle R1 shown in FIG. 24.
Figure 26:
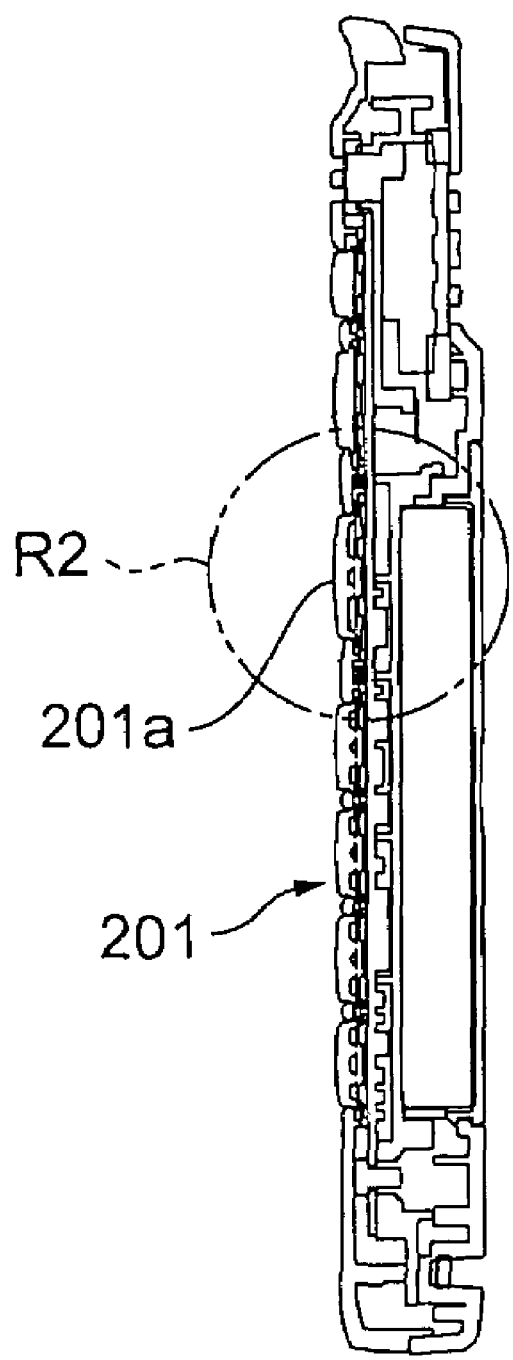
FIG. 26 is a sectional view along the arrow B to B shown in FIG. 23.
Figure 27:
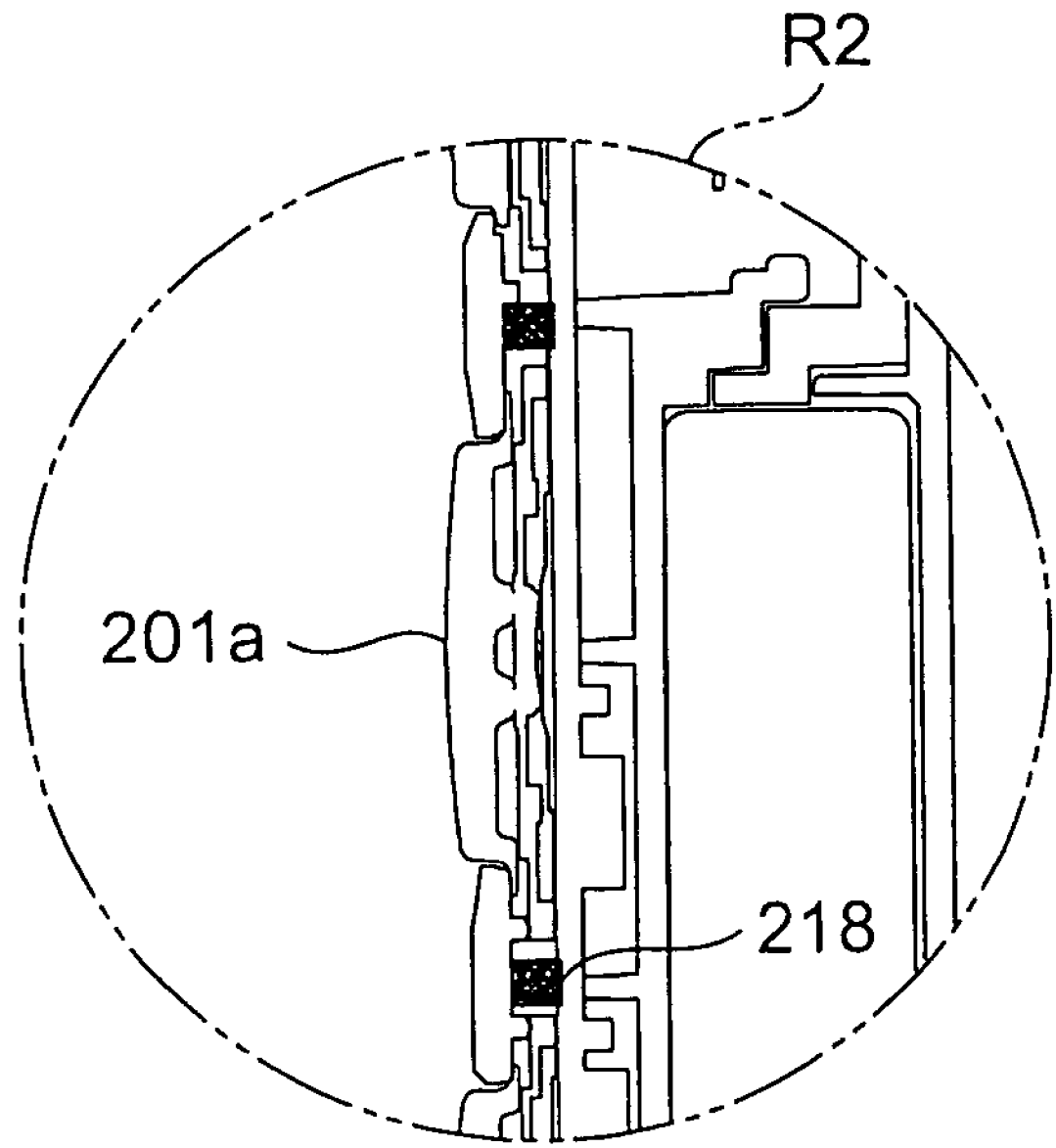
FIG. 27 is a partially enlarged view enlarging and showing the inside of a circle R2 shown in FIG. 26.

FIG. 23 is a plan view showing the downside housing. FIG. 24 is a sectional view along an arrow A to A shown in FIG. 23. FIG. 25 is a partially enlarged view enlarging and showing the inside of a circle R1 shown in FIG. 24. FIG. 26 is a sectional view along an arrow B to B shown in FIG. 23. FIG. 27 is a partially enlarged view enlarging and showing the inside of a circle R2 shown in FIG. 26.

If only the LED 222a shown in FIG. 25 emits light, the call button 201a lights up, and the light of the LED 222a is shut out by the light shielding wall 218 and is not conveyed to the other push buttons so that the push buttons other than the call button 201a remain unlit.

The call button 201a has been described here. However, it also applies to the other call button 201b.

Here, the call button 201a is the push button which lights up on receiving the ordinary call only with voice and is pushed to start the call. The other call button 201b is the push button which lights up on receiving the video-phone call and is pushed to start the video-phone call and image communication. On receiving a call, the user of this portable telephone can see whether it is the ordinary call only with voice or the video-phone call and which call button should be pushed by checking which of the two call buttons 201a and 201b is lighted up. In addition, all the push buttons light up if a folded portable telephone is opened in timing other than receiving a call so as to facilitate use in a dark place.

The portable telephone has been described above as an example of the portable terminal apparatus according to the present invention. However, any specification of communication for implementing a telephone function of the portable telephone is applicable to the present invention, such as PHS (Personal Handy Phone System).

Also, the folding type portable telephone has been described above as an example. However, the present invention is not only applicable to the folding type portable telephone but also to any form of the portable telephone.

Furthermore, the present invention is not only applicable to those in the form of the portable telephone but also to any form of the portable terminal apparatus with the telephone function, such as the portable terminal apparatus in a form similar to a PDA (Personal digital Assistance) or a wrist watch.

What is claimed is:

1. A portable terminal apparatus, comprising:
   a substantially planar chassis;
   a camera module having a first, flexible circuit board extending therefrom;
   a second circuit board having an opening formed therein and being fixedly and directly attached to the chassis, wherein the first flexible circuit board has a connector disposed extending perpendicular to the second circuit board; and
   a substantially planar camera holder receiving the camera module therein and being received in the opening in the second circuit board with the first flexible circuit board extending through the opening into a space formed between the chassis and the second circuit board.

2. The portable terminal apparatus according to claim 1, wherein the camera holder has a wall section surrounding a side face of the camera module to support the camera module in a substantially coplanar relationship with the second circuit board.

3. The portable terminal apparatus according to claim 1, further comprising a housing for non-movably receiving the chassis, wherein the camera module is non-movable relative to the chassis.

4. The portable terminal apparatus according to claim 1, wherein the holder includes a window through which the camera module can see an image.

5. A portable terminal apparatus, comprising:
   a chassis;
   a camera module having an electrical connector, for conveying an image signal, extending therefrom;
   a circuit board having an opening formed to extend therethrough and being attached to the chassis; and
   a camera holder receiving the camera module and being received in the opening in the circuit board, with the electrical connector extending through the opening and a space formed between the chassis and the circuit board, and positioned perpendicular to the circuit board.

6. The portable terminal apparatus according to claim 5, wherein the camera holder has a wall section surrounding a side face of the camera module to support the camera module in a substantially coplanar relationship with the circuit board.

7. The portable terminal apparatus according to claim 5, further comprising a housing for non-movably receiving the chassis, wherein the camera module is non-movable relative to the chassis.

8. The portable terminal apparatus according to claim 5, wherein the holder includes a window through which the camera module can see an image.

9. The portable terminal apparatus as recited in claim 1, wherein the camera module comprises a lens and an image pick-up device.

10. The portable terminal apparatus as recited in claim 5, wherein the camera module comprises a lens and an image pick-up device.

11. The portable terminal apparatus as recited in claim 1, wherein the opening is a notch formed in and extending through an edge of the second circuit board.

12. The portable terminal apparatus as recited in claim 5, wherein the opening is a notch formed in and extending through an edge of the circuit board.

13. The portable terminal apparatus as recited in claim 9, wherein the camera module has a first surface at which the lens is located, and a second surface, supported by the chassis.

14. The portable terminal apparatus as recited in claim 10, wherein the camera module has a first surface at which the lens is located, and a second surface supported by the chassis.

15. The portable terminal apparatus as recited in claim 13, wherein the housing has a window adjacent the lens.

16. The portable terminal apparatus as recited in claim 14, wherein the housing has a window adjacent the lens.

* * * * *